(12) United States Patent
Song et al.

(10) Patent No.: US 9,002,315 B2
(45) Date of Patent: Apr. 7, 2015

(54) SYSTEMS, APPARATUS AND METHODS FOR FACILITATING EMERGENCY CALL SERVICE IN WIRELESS COMMUNICATION SYSTEMS

(75) Inventors: Osok Song, San Diego, CA (US); Nathan Edward Tenny, Poway, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 989 days.

(21) Appl. No.: 12/768,249

(22) Filed: Apr. 27, 2010

(65) Prior Publication Data

US 2010/0279648 A1 Nov. 4, 2010

Related U.S. Application Data

(60) Provisional application No. 61/174,897, filed on May 1, 2009, provisional application No. 61/301,139, filed on Feb. 3, 2010.

(51) Int. Cl.
*H04M 11/04* (2006.01)
*H04W 4/22* (2009.01)
(Continued)

(52) U.S. Cl.
CPC .............. *H04W 4/22* (2013.01); *H04W 36/16* (2013.01); *H04W 76/007* (2013.01)

(58) Field of Classification Search
CPC ..... H04W 4/22; H04W 36/16; H04W 76/007; H04M 11/04; H04M 2242/04; G08B 25/016
USPC .......... 455/433, 525, 404, 432, 404.1, 456.1, 455/404.2; 379/45, 137, 38; 370/331
See application file for complete search history.

(56) References Cited

U.S. PATENT DOCUMENTS 6,240,285 B1 * 5/2001 Blum et al. ................. 455/404.1
7,184,768 B2 * 2/2007 Hind et al. ................. 455/435.3
(Continued)

FOREIGN PATENT DOCUMENTS

CN 101288330 A 10/2008
JP 2002217828 A 8/2002
(Continued)

OTHER PUBLICATIONS

3GPP: "Feasibility Study on Voice Call Continuity Support for Emergency Calls", 3GPP TR 23.826 V9.0.0, Release 9, Mar. 2009, pp. 14-18, 26-28, 58-60, 78, URL: http://www.3gpp.org/ftp/Specs/archive/23_series/23.826/23826-900.zip.
(Continued)

*Primary Examiner* — Mahendra Patel
(74) *Attorney, Agent, or Firm* — Anthony R. Morris

(57) ABSTRACT

Systems and methods for facilitating emergency call service are provided. The method can include modifying a configuration parameter of a user equipment (UE), wherein the configuration parameter is related to at least one of: network selection, cell selection or reselection or service selection within a wireless communication system, and wherein a modified configuration parameter results in a preference by the UE for a network, cell or service configured to support emergency calls at the UE. The method can also include prioritizing circuit-switched services over packet-switched services, utilizing the circuit-switched voice service preferentially or exclusively and/or prioritizing a network configured to offer emergency call service over the original serving network of the UE, based, at least, on the modifying the configuration parameter. Modifying the configuration parameter can be performed autonomously by the UE. The modified configuration can also enable callback services to a UE from the network.

48 Claims, 16 Drawing Sheets

(51) Int. Cl.
    *H04W 36/16*        (2009.01)
    *H04W 76/00*        (2009.01)

(56) References Cited

U.S. PATENT DOCUMENTS

| | | | |
|---|---|---|---|
| 7,272,386 B2 * | 9/2007 | Meer | 455/414.1 |
| 8,340,627 B2 * | 12/2012 | Edge | 455/404.1 |
| 8,369,822 B2 * | 2/2013 | Hursey | 455/404.1 |
| 8,577,379 B2 | 11/2013 | Shi | |
| 2002/0094835 A1 * | 7/2002 | Hayashi et al. | 455/522 |
| 2006/0003562 A1 | 1/2006 | Mouli | |
| 2006/0035662 A1 | 2/2006 | Jeong et al. | |
| 2006/0094397 A1 * | 5/2006 | Raghuram et al. | 455/404.1 |
| 2008/0102784 A1 * | 5/2008 | Mittal et al. | 455/404.1 |
| 2008/0220772 A1 * | 9/2008 | Islam et al. | 455/432.2 |

FOREIGN PATENT DOCUMENTS

| | | |
|---|---|---|
| JP | 2003519454 A | 6/2003 |
| JP | 2003529271 A | 9/2003 |
| JP | 2006203305 A | 8/2006 |
| JP | 2010525752 A | 7/2010 |
| WO | 9848575 A2 | 10/1998 |
| WO | 0124563 | 4/2001 |
| WO | 2005034566 | 4/2005 |
| WO | WO2005041515 | 5/2005 |
| WO | WO2005043310 A2 | 5/2005 |
| WO | WO2005043829 | 5/2005 |
| WO | WO2005043855 | 5/2005 |
| WO | 2008073600 | 6/2008 |
| WO | 2008157449 A1 | 12/2008 |

OTHER PUBLICATIONS

International Search Report and Written Opinion—PCT/US2010/033320, International Search Authority—European Patent Office—Sep. 6, 2010.

Taiwan Search Report—TW099113950—TIPO—Mar. 15, 2013.

* cited by examiner

SYSTEMS, APPARATUS AND METHODS FOR FACILITATING EMERGENCY CALL SERVICE IN WIRELESS COMMUNICATION SYSTEMS

CROSS-REFERENCE TO RELATED APPLICATIONS

This application claims the benefit of U.S. Provisional Patent Application Ser. No. 61/174,897, filed May 1, 2009, and U.S. Provisional Patent Application Ser. No. 61/301,139, filed Feb. 3, 2010, and both of which are titled "Method and Apparatus to Enable Autonomous Change of User Equipment Circuit-Switched (CS)/Packet-Switched (PS) Mode and Access Stratum Reselection Priorities at Emergency Call Initiation," and the entire contents of which are incorporated herein by reference.

BACKGROUND

I. Field

The following description relates to wireless communications, in general, and to facilitating emergency call service in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs.

UEs that move from an Long-Term Evolution (LTE) system to another radio access technology (RAT) to originate an emergency call may autonomously return to the LTE system after the emergency call ends or if the emergency call fails, due to the circuit-switched (CS) or packet-switched (PS) mode for the UE or due to the setting of the cell reselection priorities settings for the UE. As such, callback services may not be able to be provided for the UE, and performance may suffer if the UE needs to re-originate the emergency call.

Accordingly, systems, apparatus and methods for facilitating emergency call service for the UE are desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating autonomous change of CS/PS mode, and/or access stratum reselection priorities, at UE emergency call initiation.

According to related aspects, a method is provided. The method can include modifying a configuration parameter of a user equipment, wherein the configuration parameter is related to at least one of: network selection, cell selection or reselection or service selection within the wireless communication system, and wherein a modified configuration parameter results in a preference by the user equipment for a network, cell or service configured to support emergency calls at the user equipment.

According to other related aspects, a computer program product including a computer-readable medium is provided. The computer program product can include: a first set of codes for causing a computer to modify a configuration parameter of a user equipment, wherein the configuration parameter is related to at least one of: network selection, cell selection or reselection or service selection within a wireless communication system, and wherein a modified configuration parameter results in a preference by the computer for a network, cell or service configured to support emergency calls at the computer.

According to other related aspects, an apparatus is provided. The apparatus can include: means for modifying a configuration parameter of an apparatus, wherein the configuration parameter is related to at least one of: network selection, cell selection or reselection or service selection within a wireless communication system, and wherein a modified configuration parameter results in a preference by the apparatus for a network, cell or service configured to support emergency calls at the apparatus.

According to yet other related aspects, another apparatus is provided. The apparatus can include: a configuration module configured to modify a configuration parameter of an apparatus, wherein the configuration parameter is related to at least one of: network selection, cell selection or reselection or service selection within a wireless communication system, and wherein a modified configuration parameter results in a preference by the apparatus for a network, cell or service configured to support emergency calls at the apparatus.

According to other aspects, a method can include: receiving information indicative of a request for initiation of an emergency call from a user equipment; and receiving or providing emergency call service to the user equipment, wherein the receiving or providing is performed by a network based, at least, on the user equipment modifying a configuration parameter of a user equipment, wherein the configuration parameter is related to at least one of: network selection, cell selection or reselection or service selection within the wireless communication system, wherein a modified configuration parameter results in a preference by the user equipment for the network.

According to other related aspects, another computer program product including a computer-readable medium is provided. The computer program product can include: a first set of codes for causing a computer to receive information indicative of a request for initiation of an emergency call from a user equipment; and a second set of codes for causing the computer to receive or provide emergency call service to the user equipment, wherein the receiving or providing is performed by the computer based, at least, on the user equipment modifying a configuration parameter of a user equipment, wherein the configuration parameter is related to at least one of: network selection, cell selection or reselection or service selection within the wireless communication system, wherein a modified configuration parameter results in a preference by the user equipment for the network.

According to other aspects, another apparatus is provided. The apparatus can include: means for receiving information indicative of a request for initiation of an emergency call from a user equipment; and means for receiving or providing emergency call service to the user equipment, wherein receiving or providing is performed by the apparatus based, at least, on the user equipment modifying a configuration parameter of a user equipment, wherein the configuration parameter is related to at least one of: network selection, cell selection or reselection or service selection within the wireless communication system, wherein a modified configuration parameter results in a preference by the user equipment for the network.

According to yet other aspects, another apparatus is provided. The apparatus can include: a configuration module configured to: receive information indicative of a request for initiation of an emergency call from a user equipment; and receive or provide emergency call service to the user equipment, wherein providing is performed by the apparatus based, at least, on the user equipment modifying a configuration parameter of a user equipment, wherein the configuration parameter is related to at least one of: network selection, cell selection or reselection or service selection within the wireless communication system, wherein a modified configuration parameter results in a preference by the user equipment for the network.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
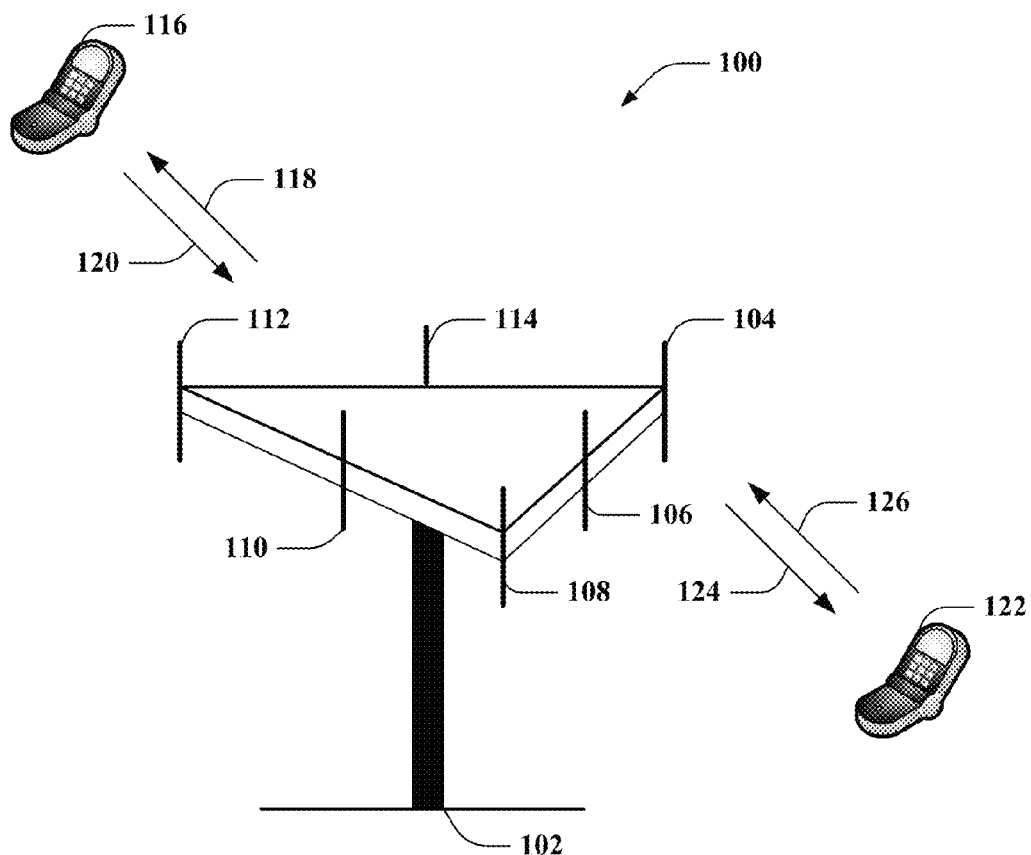
FIG. 1 is an illustration of an example wireless communication system for facilitating emergency call service in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and Global System for Mobile communications (GSM) are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP LTE or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point, BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, access point, eNodeB, macro cell, and so on. Also, a Femto node may be configured or referred to as a Home NodeB, Home eNodeB, access point access node, a BS, a Femto cell, and so on.

FIG. 1 is an illustration of an example wireless communication system for facilitating emergency call service in accordance with various aspects set forth herein. In wireless communication system 100, interference caused by transmissions on the UL can be managed by the BS 102 while interference caused by transmissions on the DL can be managed by the UEs 116, 122.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs. Further, the BS 102 and UEs 116, 122 can be configured providing configuration of scheduling policy for facilitating autonomous change of CS/PS mode, and/or access stratum reselection priorities, at UE emergency call initiation.

Figure 2:
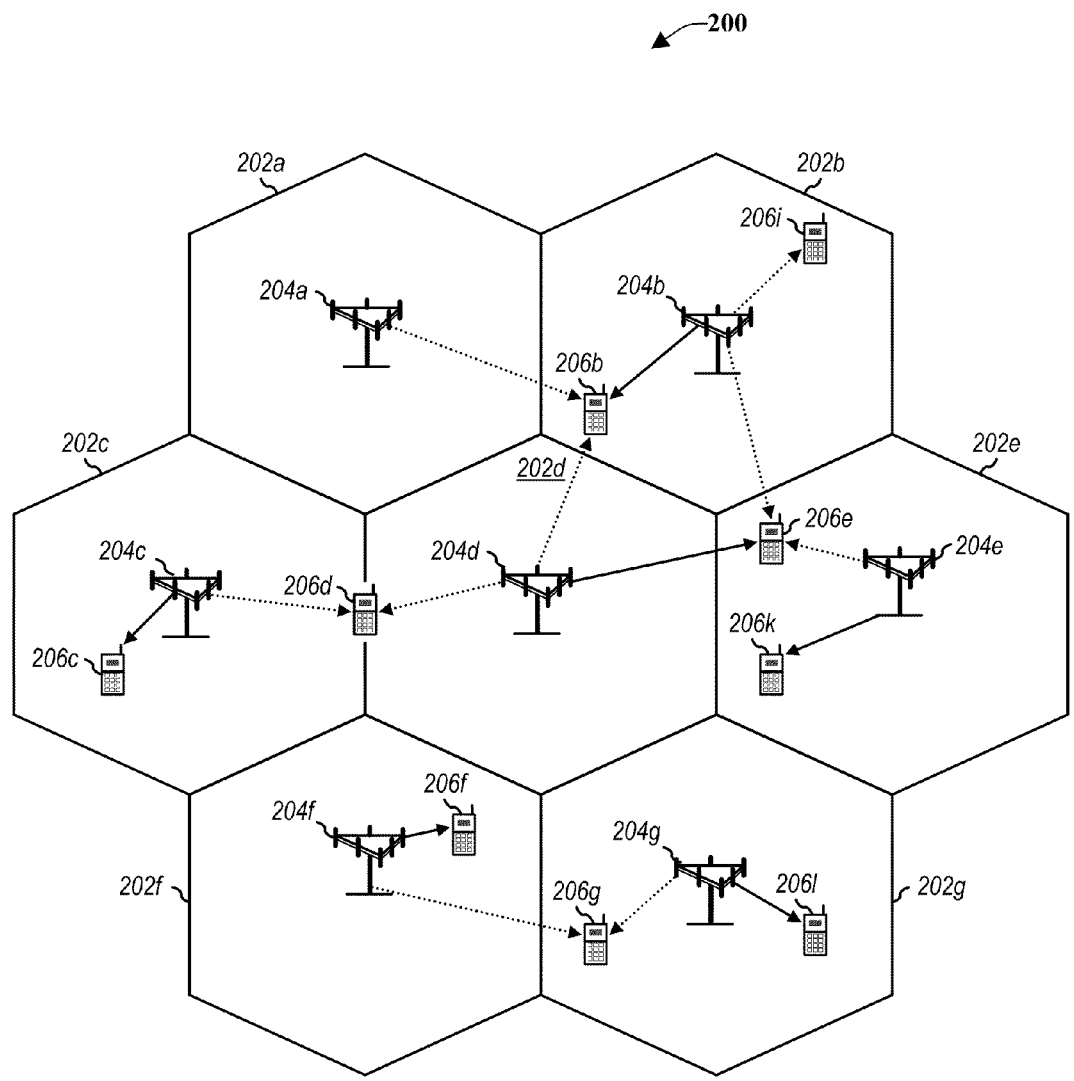
FIG. 2 is an illustration of another example wireless communication system for facilitating emergency call service in accordance with various aspects set forth herein.

FIG. 2 is an illustration of another example wireless communication system for facilitating emergency call service in accordance with various aspects set forth herein. The system 200 provides communication for multiple cells 202, such as, for example, macro cells 202A-202G, with each cell being serviced by a corresponding BS 204 (e.g., BS 204A-204G). As shown in FIG. 2, UE 206 (e.g., UEs 206A-206L) can be dispersed at various locations throughout the system over time. Each UE 206 can communicate with one or more BS 204 on a DL or a UL at a given moment, depending upon whether the UE 206 is active and whether it is in soft handoff, for example. The wireless communication system 200 may provide service over a large geographic region. For example, macro cells 202A-202G may cover a few blocks in a neighborhood.

Figure 3:
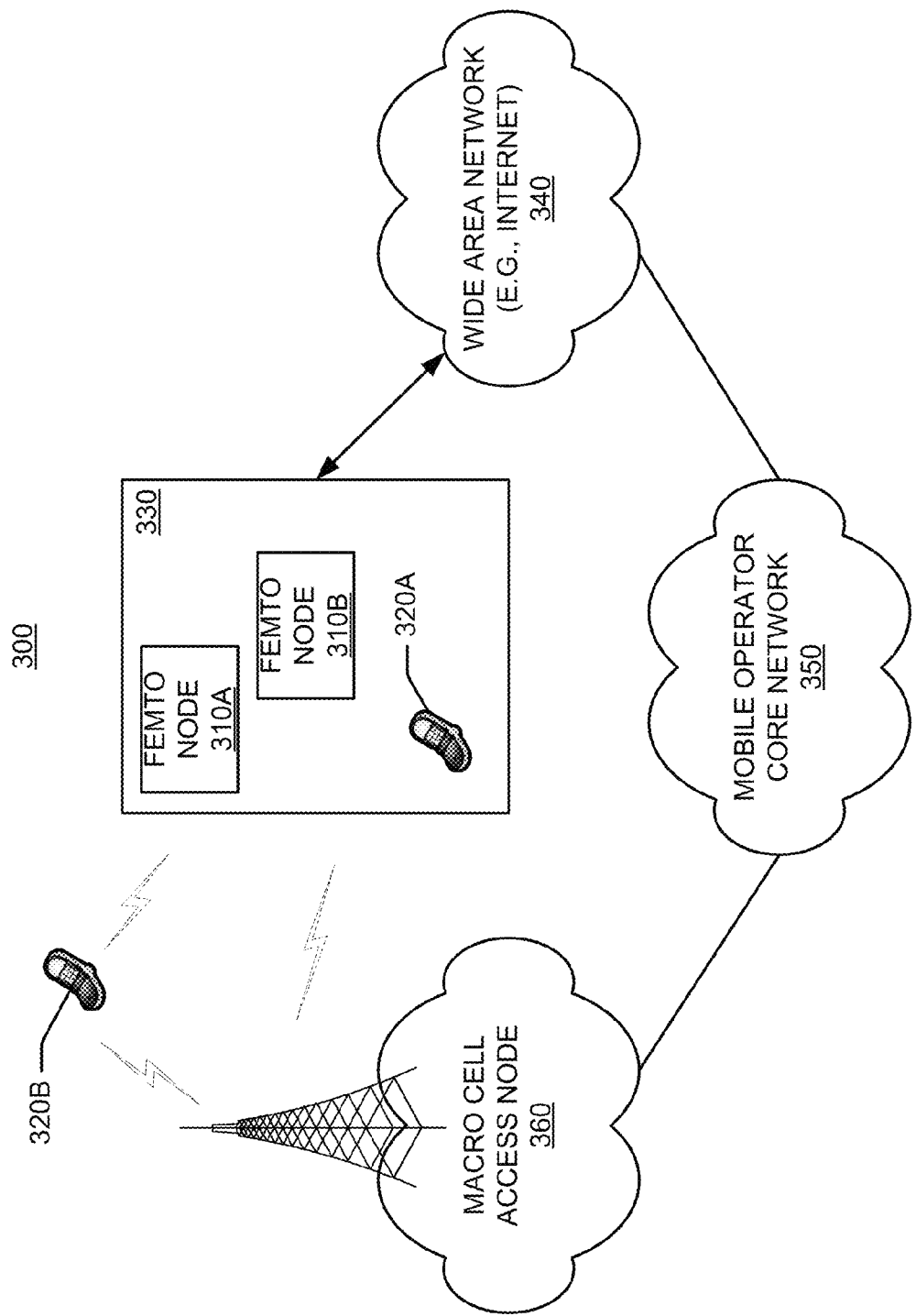
FIG. 3 is an illustration of an example wireless communication system where one or more Femto nodes are deployed for facilitating emergency call service in accordance with various aspects set forth herein.

FIG. 3 is an illustration of an example wireless communication system where one or more Femto nodes are deployed for facilitating emergency call service in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B. In embodiments, interference management can be facilitated in the system 300 as described herein.

Figure 4:
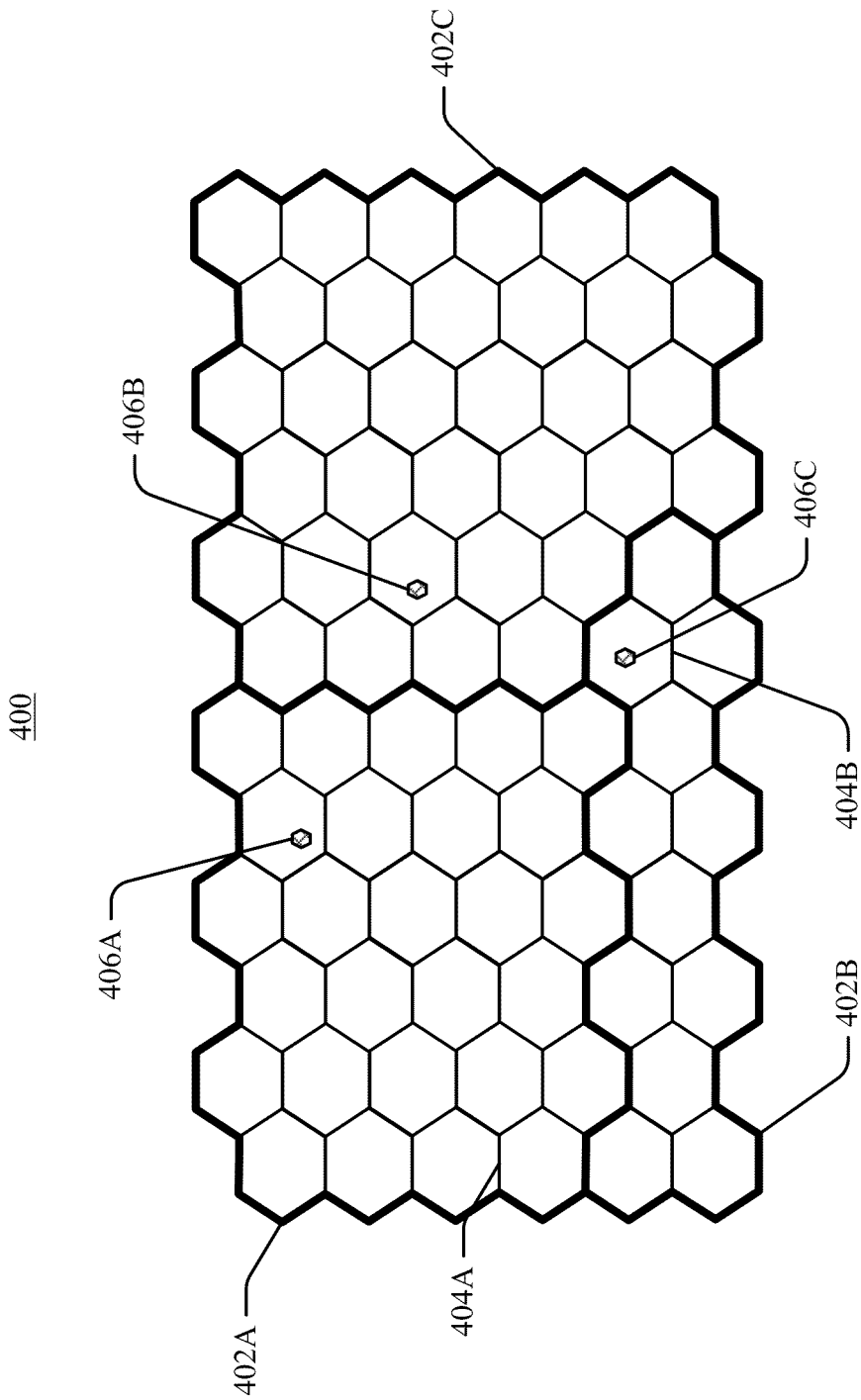
FIG. 4 is an illustration of an example coverage map in a wireless communication system for facilitating emergency call service in accordance with various aspects set forth herein.

FIG. 4 is an illustration of an example coverage map in a wireless communication system for facilitating emergency call service in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro access node (e.g., node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., node 360).

In some aspects, a UE 320 can be configured to connect to a preferred Femto node (e.g., the home Femto node of the UE 320) whenever such connectivity is possible. For example, whenever the UE 320 is within the user residence 330, it may be desired that the UE 320 communicate only with the home Femto node 310.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group Home NodeB) is one that provides service to a restricted provisioned set of UEs. This set may be temporarily or permanently extended as necessary. In some aspects, a Closed Subscriber Group (CSG) may be defined as the set of BSs (e.g., Femto nodes) that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

A wireless multiple-access communication system can simultaneously support communication for multiple wireless UEs. As mentioned above, each UE can communicate with one or more BSs via transmissions on the DL or the UL. These communication links (i.e., DL and UL) may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system can support TDD and FDD. In a TDD system, the DL and UL transmissions can be on the same frequency region so that the reciprocity principle allows the estimation of the DL channel from the UL. This enables the BS to transmit beam-forming gain on the DL when multiple antennas are available at the BS. In some embodiments, the channel conditions of the UL channel can be estimated from the DL channel, for interference management, as described herein.

Systems, methods and apparatus for facilitating emergency call service for a UE can be provided. Embodiments can employ autonomous change of configurations related to or including UE CS/PS mode, access stratum (AS) reselection priorities and/or voice domain service preferences to facilitate provisioning of the emergency calls. The autonomous change of configuration can be performed at the UE in various embodiments. As such, embodiments disclosed herein can enable a UE camped on a system that does not provide emergency service to move to or prefer a network, cell or service type providing emergency service. Further, callback from the network providing the emergency service, and corresponding adherence to jurisdictional emergency service requirements, can also be provided.

In embodiments herein, a UE operating in a first mode that causes packet data services to be prioritized over CS voice services can change its configuration so that the UE operates in a second mode. The second mode can be a mode that does not cause packet data services to be prioritized over CS voice services. Various embodiments are as described below.

In some embodiments, whenever a UE camped on the LTE BS initiates a CS emergency call, the UE temporarily changes the UE mode of operation as follows: if the UE is in CS/PS mode 2, the UE changes the UE mode of operation to CS/PS mode 1. If the UE is in PS mode 2, the UE changes the UE mode to PS mode 1 or to CS/PS mode 1. This approach is described in greater detail below.

Figure 5:
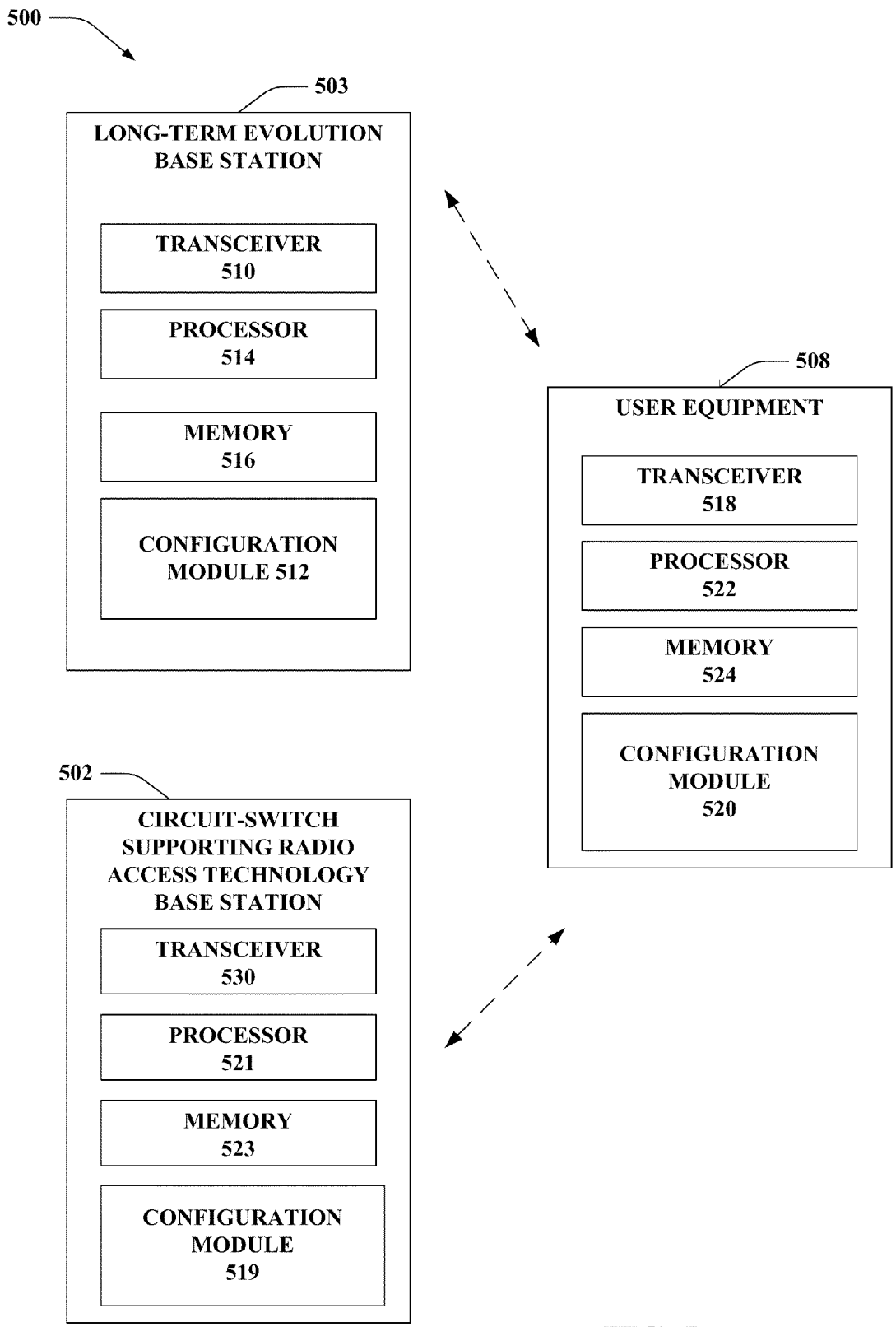
FIG. 5 is an illustration of an example block diagram of a wireless communication system for facilitating emergency call service in accordance with various aspects set forth herein.
Figure 6A:
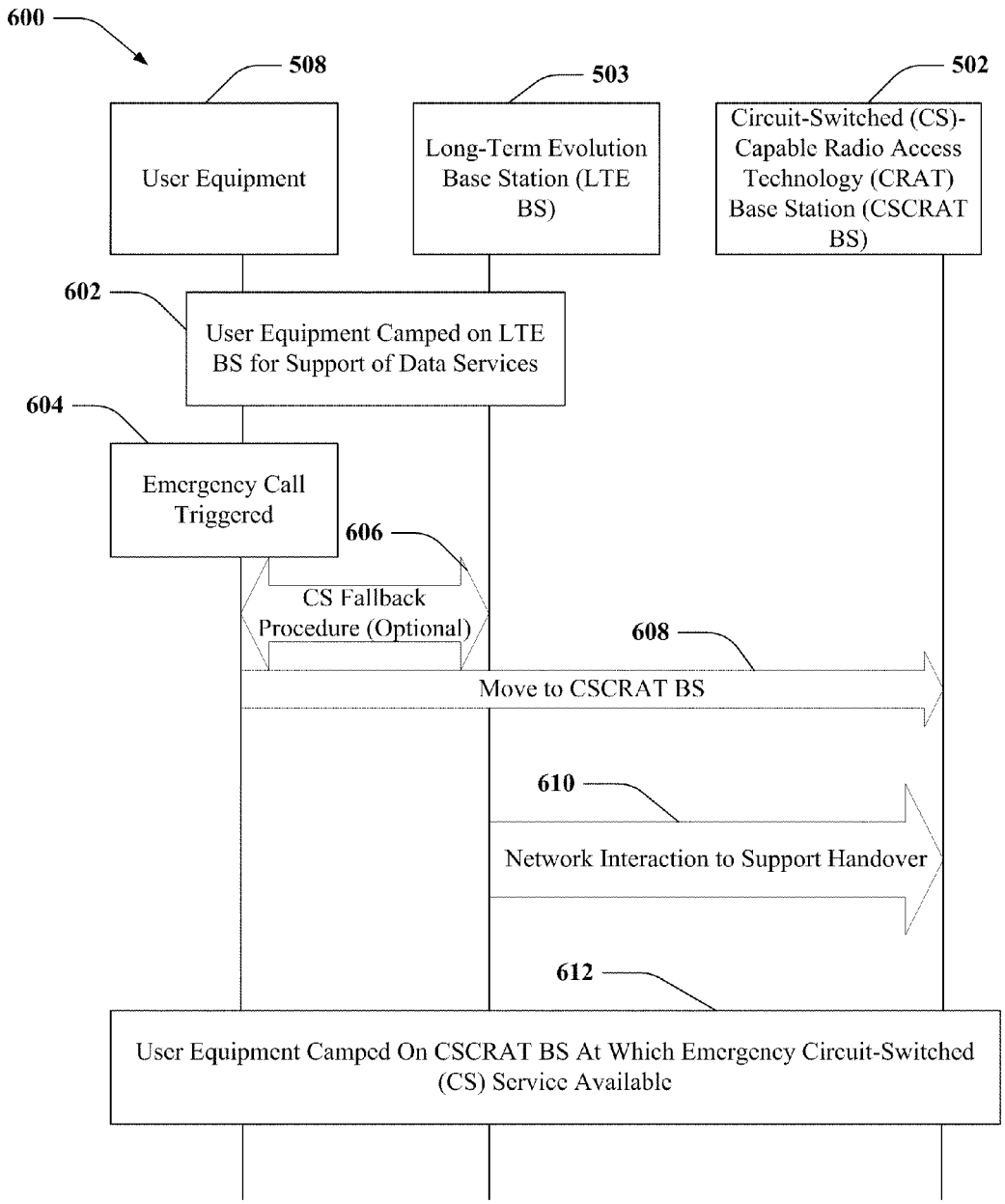
FIGS. 6A and 6B are illustrations of examples of flow diagrams in a wireless communication system for facilitating emergency call service in accordance with various aspects set forth herein.
Figure 6B:
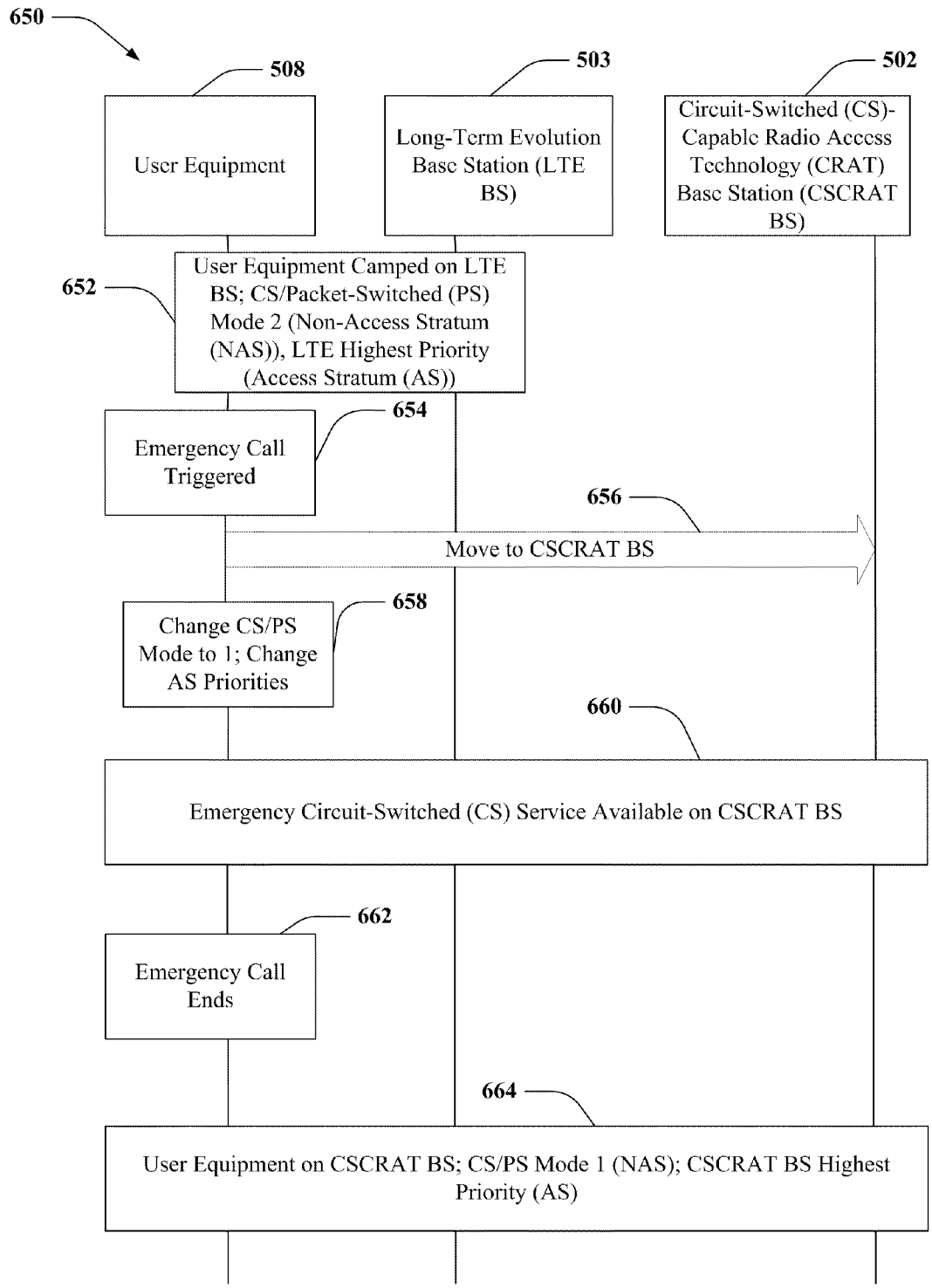
Figure 7:
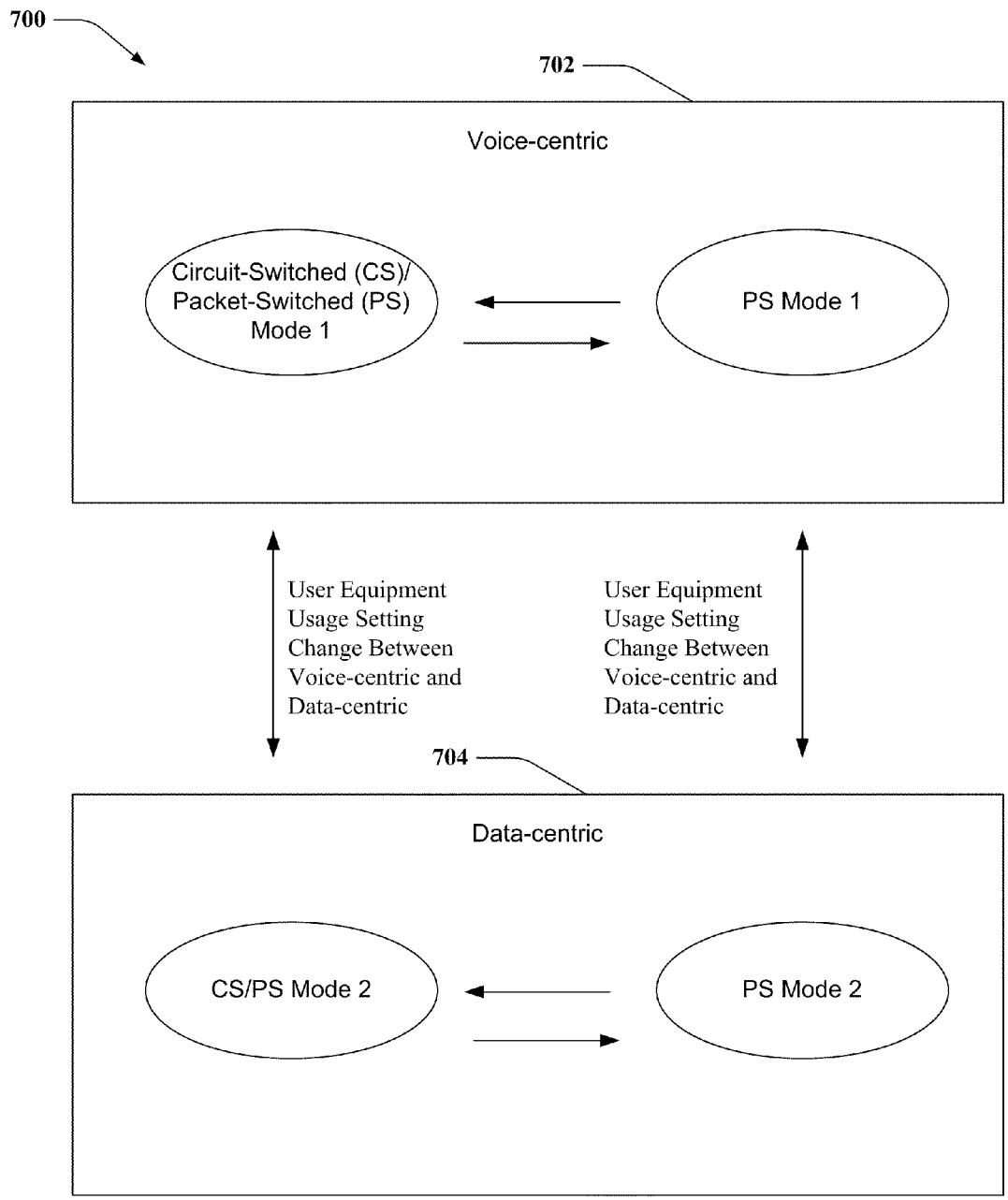
FIG. 7 is an illustration of an example flow diagram in a wireless communication system for facilitating emergency call service accordance with various aspects set forth herein.

FIG. 5 is an illustration of an example block diagram of a wireless communication system for facilitating emergency call service in accordance with various aspects set forth herein. FIGS. 6A and 6B are illustrations of examples of flow diagrams in a wireless communication system for facilitating emergency call service in accordance with various aspects set forth herein. FIG. 7 is an illustration of an example flow diagram in a wireless communication system for facilitating emergency call service in accordance with various aspects set forth herein.

The wireless communication system 500 of FIG. 5 will be described with reference to FIG. 5 and the flow diagrams of FIGS. 6A, 6B and 7. The wireless communication system 500 can include BSs and at least one UE 508. A first BS can be, or at least include, an LTE BS 503 configured to manage an LTE system and a second BS can be, or at least include, a CS-capable (CSC) RAT (collectively, CSCRAT) BS 502. By way of examples, but not limitation, the CSCRAT BS 502 can be a GSM BS, a UMTS BS or a cdma2000 BS. In some embodiments, the CSCRAT BS 502 can be any type of BS configured to provide emergency call services to the UE.

LTE BS 503 and CSCRAT BS 502 can include transceivers 510, 530, respectively. The transceivers 510, 530 can be configured to transmit and receive voice, data and/or control information and/or any other type of information described herein with reference to any of the systems, methods, apparatus and/or computer program products to and from UE 508.

For example, with reference to FIG. 6A, LTE BS 503 can be configured to provide data services by transmission of data to and from the UE 508. By contrast CSCRAT BS 502 can be configured to provide CS voice services to the UE 508. As such, the UE can camp on the LTE BS 503 for support of data services and can receive CS voice services upon an emergency call being triggered, as shown in FIGS. 6A and 6B.

As other examples, in various embodiments, transceivers 510, 530 can be configured to transmit and receive information conducted during an emergency call, handover signaling, control information for emergency call initiation, callback or re-origination, public land mobile network (PLMN) selection, parameters and/or information associated with configuring the access stratum (AS) reselection priorities and/or CS/PS mode of the UE.

LTE BS 503 and CSCRAT BS 502 can also include configuration modules 512, 519 configured to evaluate the configuration information of the UE 508 to determine one or more of: the CS/PS mode of the UE 508, the AS reselection priorities of the UE 508 and the configuration of the UE 508 generally. The configuration modules 512, 519 can also be configured to transmit or receive information to or from the UE 508 or perform emergency callback or other functions described herein and related to facilitating an emergency call, or callback for an emergency call, originated by the UE 508 herein.

Referring back to FIG. 5, LTE BS 503 and CSCRAT BS 502 can also include processors 514, 521, respectively, and memory 516, 523, respectively. Processors 514, 521 can be configured to perform one or more of the functions described herein with reference to any of the systems, methods, apparatus and/or computer program products. The CSCRAT BS 502 and LTE BS 503 can include memory 516, 523, respectively. By way of example, but not limitation, the processors 514, 521 can be configured to perform operations for facilitating the UE 508 movement between the LTE BS 503 and the CSCRAT BS 502, operating according to the AS priorities of the UE 508 and/or operating according to the CS/PS mode of the UE 508. For example, as shown with reference to FIG. 6A, the LTE BS 503 and CSCRAT BS 502 can include processors 514, 521 configured to perform functions for network interaction to support handover for the UE 508 as the UE 508 is handed over from the LTE BS 503 to the CSCRAT BS 502.

The memory 516, 523 can be for storing computer-executable instructions and/or information for performing the functions described herein with reference to any of the systems, methods, apparatus and/or computer program products of the LTE BS 503 and CSCRAT BS 502, respectively.

The wireless communication system 500 can also include UE 508 can include a transceiver 518. The transceiver 518 can be configured to transmit and receive voice or data or control information to and from the UE 508. For example, with reference to FIG. 6A, when the UE 508 is camped on the LTE BS 503, the transceiver 518 can transmit and receive data traffic. However, as discussed above, and shown in FIGS. 6A and 6B, the UE 508 can move to the CSCRAT BS 502 and transmit and receive CS voice traffic. For example, when the UE 508 initiates an emergency call, the UE 508 can be moved to the CSCRAT BS and transmits CS voice while, prior to the initiation of the emergency call, the UE 508 can transmit data and/or PS voice.

The UE 508 can also include a configuration module 520 configured to assign, change and/or modify the configuration information of the UE 508. In various embodiments, the change in configuration information can be an autonomous change by the UE 508. In various embodiments, the UE 508 can change configuration from LTE BS 503 to CSCRAT BS 502 because the LTE BS 503 does not provide emergency call service and/or because the UE 508 is not configured to receive emergency call service on the network of the LTE BS 503.

The configuration module 520 can assign, change and/or modify configuration regarding any number of operations of the UE 508 including, but not limited to, the CS/PS mode of the UE 508, the AS reselection priorities of the UE 508 and the configuration of the UE 508 generally. With reference to FIGS. 6A, 6B and 7, the configuration module 520 can determine whether the UE 508 is camped on the LTE BS 503, will move over to the CSCRAT BS 502, whether the CS/PS mode, or the PS mode, for the UE 508 is 1 or 2, the AS priorities, and the network-level and service-level behavior and/or preferences of the UE 508 generally. For example, with regard to service-level behavior, as shown in FIG. 7, the configuration module 520 can determine whether the UE 508 operates according to a voice-centric or a data-centric communication approach.

The UE 508 can also include a processor 522 and memory 524. The processor 522 can be configured to perform one or more of the functions described herein with reference to any of the systems, methods, apparatus and/or computer program products of the UE 508. By way of example, but not limitation, the processor 522 can be configured to perform operations for facilitating the UE 508 movement between the LTE BS 503 and the CSCRAT BS 502, operating according to the AS priorities of the UE 508 and/or operating according to the CS/PS mode of the UE 508. The memory 524 can be for storing computer-executable instructions and/or information for performing the functions described herein with reference to any of the systems, methods, apparatus and/or computer program products.

Referring now to FIG. 6A, in some embodiments, a flow diagram 600 showing a method of operating a wireless communication system can be as follows. The flow diagram 600 can illustrate a method of transferring a UE 508 to a CSCRAT BS 502 for an emergency call.

For example, while the UE 508 is configured with CS/PS mode 2 (and therefore prioritizing packet data services over CS voice services), the UE 508 will tend to camp on the network of the LTE BS 503, notwithstanding multiple RATs are available to the UE 508. However, in embodiments wherein the network for the LTE BS 503 is an LTE Release 8 network, because the LTE Release 8 network has no support for emergency calls, the UE 508 on the network for the LTE BS 503 can move to the CSCRAT BS 502. The UE 508 can move using any of several operations and/or mechanisms available in the LTE Release 8 specifications, to make an emergency call. As mentioned above, the flow diagram 600 illustrates one such method of transferring a UE 508 to a CSCRAT BS 502 for an emergency call.

In some embodiments, if the AS of the UE 508 is configured to prioritize the LTE BS 503 higher than other RATs (including the CSCRAT BS 502), the UE 508 is likely to reselect the LTE BS 503 when the UE 508 returns to the idle mode in the CSCRAT BS 502 and the emergency call has terminated or has failed. The UE 508 can override these configured priorities in order to make an emergency call. However, after the call has ended, the configured priorities can revert to the state of that at the start of the flow diagram 600 and performing a callback can be hampered. For example, the network won't be able to deliver the callback if the UE 508 is in CS/PS mode 2 and neither CS Fallback (CSFB) nor IMS voice is available or if the UE 508 is in PS mode 2 and IMS voice is not available. CSFB can be an method whereby when the UE 508 is served by the network for the LTE BS 503, the mobile switching center (MSC) can transmit paging information to the UE 508. CSFB can be as defined in LTE Release 8. In some embodiments, CSFB can include the following. If the UE 508 accepts the voice call then the UE is handed over to a GSM network, a UMTS network or a cdma2000 network.

Referring back to FIG. 6A, in another example, if the UE 508 is operating in a CS/PS mode 1 (prioritizing CS voice), but having support for Internet Protocol (IP) Multimedia Subsystem (IMS) voice as well, the UE 508 can also tend to camp preferentially on a network for the LTE BS 503 if the network offers IMS voice. This functionality on the part of the UE 508 is acceptable for non-emergency voice uses, but for embodiments of the network of the LTE BS 503 wherein emergency calls cannot be offered via IMS voice (e.g., an LTE Release 8 network supporting IMS), similar callback problems to those discussed in the above example can result.

Flow diagram 600 illustrates a method of transferring a UE to a CSCRAT BS 502 for an emergency call. At 602, the flow diagram 600 can include the UE 508 camping on the LTE BS 503 for support of data services. At 604, the flow diagram 600 can include an emergency call being triggered by the UE 508. At 608, the flow diagram 600 can include the UE moving to the CSCRAT BS 502. At 610, the flow diagram 600 can include network interaction between the LTE BS 503 and the CSCRAT BS 502 being performed to enable and facilitate the transfer of the UE 508 from the LTE BS 503 to the CSCRAT BS 502. At 612, the flow diagram can include the UE 508 being camped on the CSCRAT BS 502 at which CS emergency services are available. In some embodiments, the flow diagram 600 can also include, at 606, the UE performing a CS fallback procedure. The CS fallback procedure can be performed prior to moving to the CSCRAT BS at 608.

At the conclusion of the flow diagram 600, the UE 508 is either already in an emergency call (if CS fallback via handover was used) or ready to originate an emergency call in the CSCRAT BS 502 (if another CS fallback mechanism was used, or if the network for the LTE BS 503 or the UE 508 did not support CS fallback so that the UE 508 needed to reselect autonomously). However, when the emergency call ends (or if the origination fails for some reason), the UE 508 will retain the configured preference for the network for the LTE BS 503 and is likely to tend to move back into LTE network coverage. If the emergency situation for which the emergency call was initiated has been resolved, this reversion to the LTE network can be acceptable. However, various jurisdictions have a callback requirement associated with emergency services. As such, in some embodiments of flow diagram 600 (e.g., embodiments without support of CS fallback), the network for the LTE BS 503 would not be able to deliver a callback to the UE 508. In addition, if the emergency call failed or dropped, the UE 508 would need to be able to re-originate the call without going through the flow diagram 600. As such, the operations of flow diagram 650 as discussed below, can be employed in some embodiments.

Referring now to FIG. 6B, in some embodiments, a flow diagram 650 showing a method of operating a wireless communication system can be as follows. The flow diagram 650 can enable autonomous change of CS/PS mode for the UE 508, AS priorities for the UE 508 and/or voice domain preference for the UE 508. One or more of the changes can be autonomously performed by the UE 508 to perform the operations described herein.

For example, when the UE 508 is in CS/PS mode 2 and moves to the CSCRAT BS 502 for an emergency call, the UE 508 can autonomously change the CS/PS mode for the UE 508 to mode 1. Such change in configuration can cause the UE 508 to remain on the CSCRAT BS 502, which can offer the UE 508 CS voice service even after the original emergency call has terminated or failed (thereby improving the likelihood of compliance with emergency callback for a particular jurisdiction in which the CSCRAT BS 502 is located). In various embodiments, changing to CS/PS mode 1 can make the network for the LTE BS 503 a lower priority than the priority of the network for the CSCRAT BS 502 and/or completely disable the ability to operate on the network for the LTE BS 503. The ability to operate on the network for the LTE BS 503 can be disabled in any number of ways including, but not limited to, turning off the functionality of the transceiver 518 to receive LTE BS 503 signals.

As another example, in addition to or as an alternative to the above change in configuration, in some embodiments, the configuration of the AS of the UE 508 can be changed such that the LTE BS 503 is prioritized below the CSCRAT BS 502. This change could prevent a reversion to LTE similar to that described for FIG. 6A from originating in the radio layers of the UE, which might otherwise occur in idle mode, even if the NAS layer had changed its CS/PS mode as described above.

Further, as another example, in addition to or as an alternative to the above change in configuration, irrespective of the CS/PS mode of the UE 508, the UE 508 can change voice domain preferences associated with the UE 508. For example, the UE can change a preference from CS voice preferred (which can enable the UE 508 to select the network of the LTE BS 503 after the emergency call terminates or fails) to CS voice only (which can cause or force the UE 508 to remain on the network of the CSCRAT BS 502 after the emergency call terminates or fails).

The flow diagram 650 illustrates the above-described changes in configurations possible at the UE 508. At 652, the flow diagram 650 can include the UE 508 camping on the LTE BS 503. In some embodiments, the UE 508 can have its configuration module 520 configured such that the non-access stratum (NAS) of the UE 508 is in CS/PS mode 2. In some embodiments, the CS/PS mode 2 can be a mode such that PS data services are prioritized over CS voice services.

In some embodiments, the UE 508 can also be configured such that the LTE network (and correspondingly, the LTE BS 503) is configured to have the highest priority for the UE 508. As such, the UE 508 can be configured to camp on the LTE BS 503 as a default.

At 654, the flow diagram 650 can include an emergency call being triggered by the UE 508. At 656, the flow diagram 650 can include the UE 508 moving to the CSCRAT BS to conduct a CS voice emergency call. At 658, the flow diagram 650 can include the UE changing its configuration such that the CS/PS mode for the UE 508 is 1. In some embodiments, CS/PS mode 1 can be a mode whereby CS voice is prioritized over other types of voice and over data traffic.

At 660, the flow diagram 650 can include the UE 508 being camped on the CSCRAT BS 502 through which CS emergency services are available. At 662, the flow diagram 650 can include the emergency call ending. At 664, the flow diagram 650 can include, after the emergency call ends at 662, the UE 508 remaining camped on the CSCRAT BS 502, the CS/PS mode remaining 1 and the network for the CSCRAT BS 502 being the highest priority for the UE 508. As such, in embodiments wherein the flow diagram 650 further includes a callback, the CSCRAT BS 502 can call the UE 508 back via the CS voice for which the UE 508 is configured to operate. Also, the UE 508 remains connected to the network for the CSCRAT BS 502 due to the configuration change prioritizing the network for the CSCRAT BS 502 highest (and therefore at a higher priority than the LTE BS 503).

When the flow diagram 650 terminates, the UE 508 can be in CS/PS mode 1, and thereby prioritize CS voice service over PS data service. The AS cell reselection priorities can also be modified relative to the priorities at the start of the flow diagram 650. While these changes can cause the desired behavior associated with the emergency call, in some embodiments, the changes should be eventually reversed once the emergency call and associated operations (e.g., emergency call callback from the CSCRAT BS 502 and call re-originations) are completed, or at a time during which there is a high likelihood that such emergency call and associated operations are likely to be completed. As such, in the embodiments described, the changes to the configuration can be limited. A plurality of event triggers can cause the configuration of the UE to revert to one or more of the configurations of the UE 508 at the start of the flow diagram 650. The event triggers can include, but are not limited to, power off of the UE 508, PLMN selection and passage of a selected amount of time (e.g., a timer-based approach to determining when the configuration should revert). One or more of the event triggers can be specified in the UE or as designed by the policies by which the network operator operates. In the case of a timer-based approach, a timer could have a timer value that could be pre-programmed in the UE or that could be signaled over the air to the UE in some embodiments. By signaling the timer value over the air, the network operator can set the timer value appropriately based on operating conditions in the network. For example, because different networks may be in jurisdictions having different emergency callback requirements (and different requirements as to when emergency callbacks have to be able to be able to be made to the UE), the operators for the different networks can set the timer values according to the callback requirements of the particular jurisdiction for the network.

Referring now to FIG. 7, flow diagram 700 can illustrate a method of operating a wireless communication system to facilitate the embodiments described herein. The method can be dictated by the mode of operation that the UE 508 is in or that the UE 508 changes its configuration to operate within. In various embodiments, the change in operation can be a result of a UE initiating a CS emergency call, a change of UE 508 usage setting for a CS voice capable UE, a change of voice domain preference as defined in 3GPP TS 24.167 for a CS voice capable UE, an indication of unsuccessful IMS registration from the upper layers, and/or a change in UE configuration regarding the use of SMS as defined in 3GPP TS 24.167.

In various embodiments, with reference to 702, the UE 508 can change from PS mode 1 to CS/PS mode 1 (or with reference to 704, from PS mode 2 to CS/PS mode 2). The change in mode can be a result of change in voice domain preference. For example, the above-mentioned changes in mode can result from the UE 508 changing: from IMS PS voice only to CS voice only; from IMS PS voice only to CS voice preferred, IMS PS voice as secondary; from ISM PS voice preferred, CS voice as secondary to CS voice only; or from IMS PS voice preferred, CS voice as secondary to CS voice preferred, IMS PS voice as secondary.

In some embodiments, when the UE 508 has CS voice capability, the change from PS mode 1 to CS/PS mode 1 can be made based solely on unsuccessful IMS registration information from upper layers or SMS configuration being set to not prefer to use SMS over IP networks.

In some embodiments, when the UE 508 has CS voice capability, the change from CS/PS mode 1 to PS mode 1 can be made based on the SMS configuration being changed to prefer to use SMS over IP networks, and the UE 508 being IMS registered.

In various embodiments, with reference to 702, the UE 508 can change from PS mode 1 to CS/PS mode 1 (or with reference to 704, from PS mode 2 to CS/PS mode 2) based, at least, on unsuccessful IMS registration information from upper layers and voice domain preference being IMS PS voice preferred, CS voice as secondary or the unsuccessful IMS registration information from upper layers and SMS configuration being set to prefer to sue SMS over IP networks.

In various embodiments, with reference to 704, the UE can change the configuration from PS mode 2 to CS/PS mode 2 based, at least, on unsuccessful IMS registration information from upper layers and the voice domain preference being IMS PS voice preferred, CS voice as secondary or the unsuccessful IMS registration information from upper layers and SMS configuration being set to prefer to use SMS over IP networks.

In some embodiments, when the UE 508 has no CS voice capability, the change from PS mode 2 to CS/PS mode 2 can be made based on unsuccessful IMS registration information from upper layers or SMS configuration being set to not prefer to use SMS over IP networks.

In various embodiments, with reference to 702, the UE 508 can change from PS mode 1 to CS/PS mode 1 based, at least, on the SMS configuration being changed to not use SMS over IP networks.

In various embodiments, with reference to 704, the UE can change the configuration from PS mode 2 to CS/PS mode 2 based, at least, on the SMS configuration being changed to not use SMS over IP networks.

In various embodiments, with reference to 702, the UE 508 can change from CS/PS mode 1 to PS mode 1 based, at least, on the SMS configuration being changed to prefer to use SMS over IP networks, the UE being IMS registered and/or the voice domain preference being IMS PS voice only.

In various embodiments, with reference to 704, the UE can change the configuration from CS/PS mode 2 to PS mode 2 based on the SMS configuration being changed to prefer to use SMS over IP networks, the UE being IMS registered and/or the voice domain preference being IMS PS voice only.

In some embodiments, when the UE 508 has no CS voice capability, the change from CS/PS mode 2 to PS mode 2 can be made based on the SMS configuration being set to prefer to use SMS over IP networks and the UE 508 being IMS registered.

In some embodiments, the UE 508 can also change from CS/PS mode 1 to PS mode 1 (or from CS/PS mode 2 to PS mode 2) based, at least, on a "CS domain not available message" received by the UE. In both cases, after the transition to PS mode 1 or PS mode 2 in this case, the UE 508 can move back to the CS/PS mode 1 or the CS/PS mode 2 configuration (due to a change of PLMN that is not in the list of equivalent PLMNs).

In various embodiments, the UE 508 can transition between a voice-centric paradigm of 702 to a data-centric paradigm of 704 by changing UE 508 usage settings to or from voice-centric or data-centric settings. For example, the UE 508 can change mode from CS/PS mode 1 to CS/PS mode 2 (or from CS/PS mode 2 to CS/PS mode 1) based on a change in usage settings from voice-centric to data-centric settings (or from data-centric to voice-centric settings). As another example, the UE 508 can change mode from PS mode 1 to PS mode 2 (or from PS mode 2 to PS mode 1) based on a change in usage settings from voice-centric to data-centric settings (or from data-centric to voice-centric settings).

Additionally, in various embodiments, the UE can operate in a PS mode and therefore not prefer the CS domain. However, for emergency call services, the UE 508 can change the UE 508 configuration to prefer a network configured to offer the emergency call service.

FIGS. 8A, 8B, 8C and 8D are illustrations of examples of flow charts of methods for facilitating emergency call service in accordance with various aspects set forth herein.

In various embodiments, the UE can change configuration if the original serving network of the UE does not provide emergency call service and/or if the UE is not configured to receive emergency call service on the original serving network of the UE.

Figure 8A:
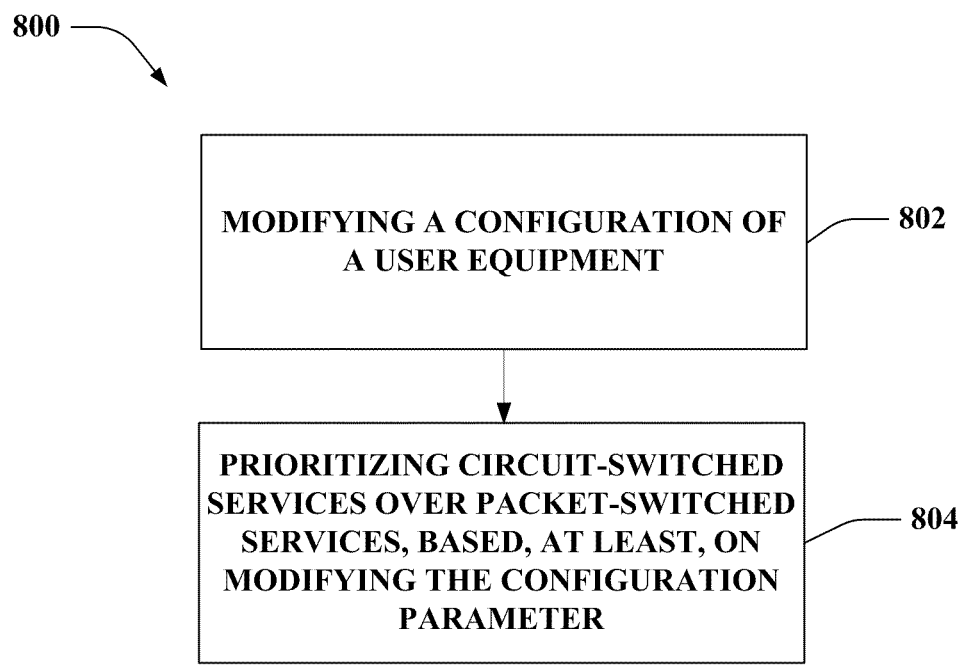
FIGS. 8A, 8B, 8C, 8D, and 8E are illustrations of examples of flow charts of methods for facilitating emergency call service in accordance with various aspects set forth herein.

Referring first to FIG. 8A, method 800 can include, at step 802, modifying a configuration parameter of a UE. In some embodiments, the configuration parameter is related to at least one of: network selection, cell selection or reselection or service selection within the wireless communication system, and wherein a modified configuration parameter results in a preference by the UE for a network, cell or service configured to support emergency calls.

In some embodiments, the configuration parameter includes information indicative of a circuit-switched/packet-switched mode of the UE, and, at 804, method 800 includes prioritizing circuit-switched services over packet-switched services based, at least, on the modifying the configuration parameter.

Figure 8B:
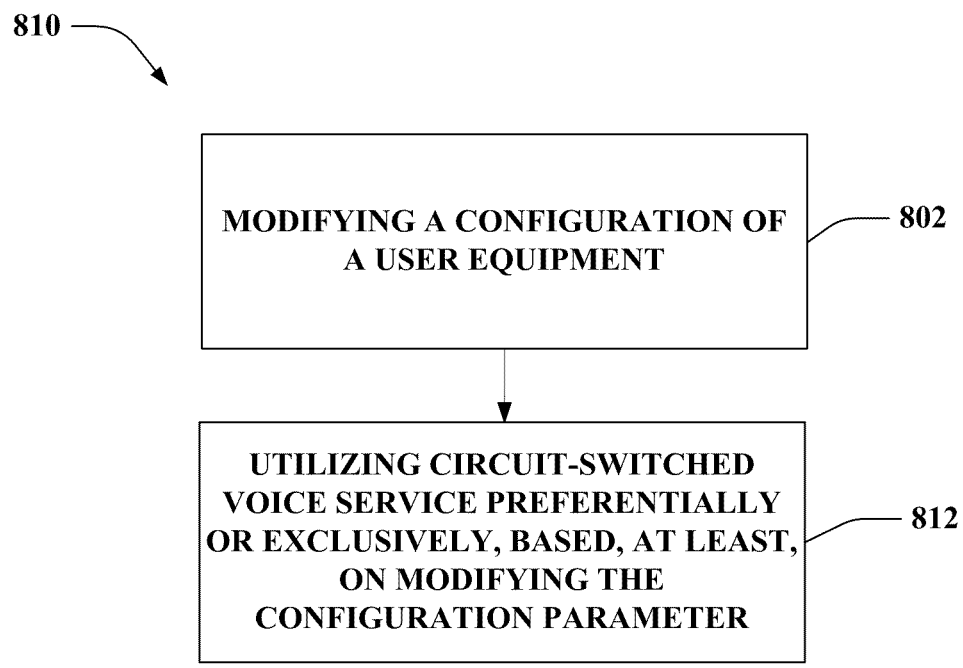

Referring now to FIG. 8B, method 810 can include, step 802 as previously described. In some embodiments, a plurality of voice services, including a circuit-switched voice service, are available to the UE. The configuration parameter can include information indicative of a voice domain preference of the UE. At 812, method 810 can include utilizing the circuit-switched voice service preferentially or exclusively based, at least, on the modifying the configuration parameter.

Figure 8C:
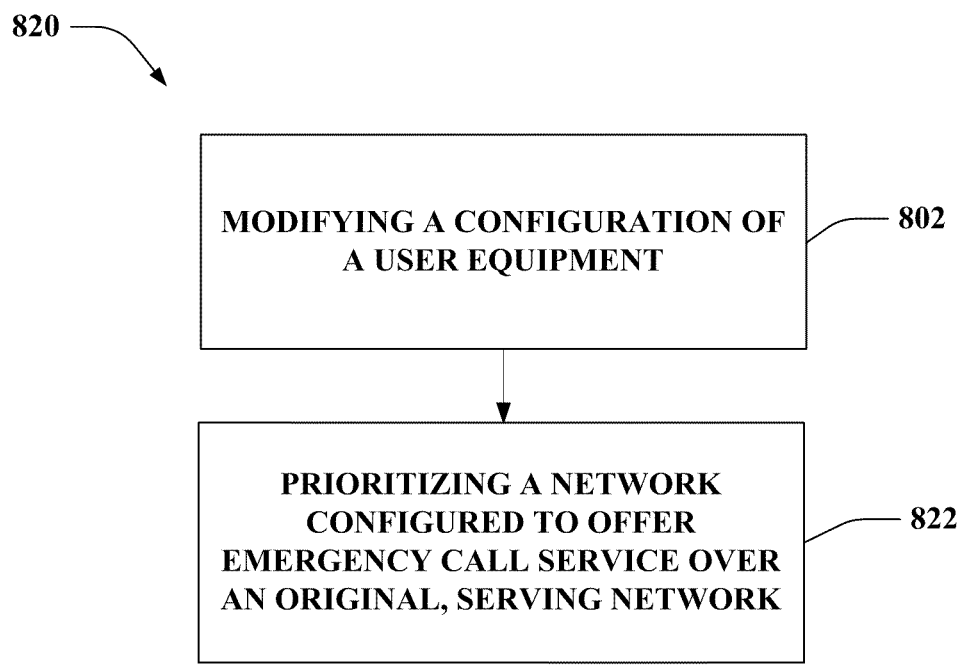

Referring now to FIG. 8C, method 820 can include, step 802 as previously described. In some embodiments, the configuration parameter includes information indicative of a plurality of cell reselection priorities, and the wireless communication system includes a plurality of networks wherein at least one of the plurality of networks is an original serving network of the UE and at least another of the plurality of networks is a network configured to offer the emergency call service. At 822, method 820 can include prioritizing the network configured to offer the emergency call service over the original serving network of the UE. In some embodiments, the prioritizing can be based, at least, on the modifying the configuration parameter. In some embodiments, the prioritizing can be based on a determination by the UE of whether the UE can obtain voice services from the original serving network.

Figure 8D:
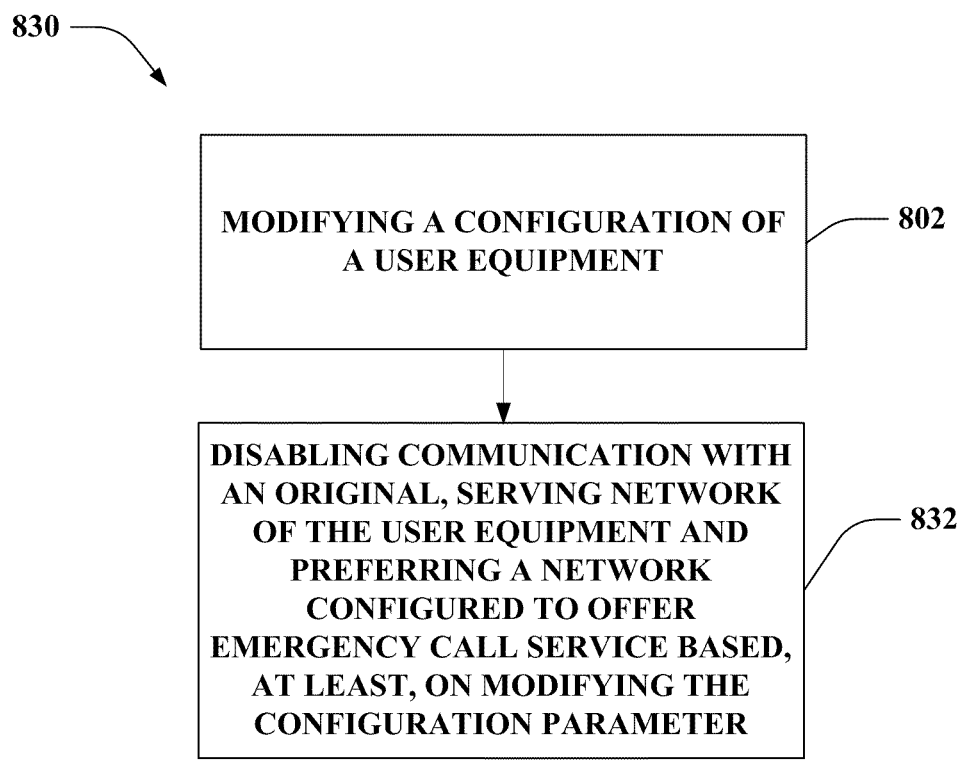

Referring now to FIG. 8D, method 830 can include, step 802 as previously described. In some embodiments, the configuration parameter includes information indicative of a plurality of cell reselection priorities, wherein the wireless communication system includes a plurality of networks wherein at least one of the plurality of networks is an original serving network of the UE and at least another of the plurality of networks is a network configured to offer the emergency call service. At 832, method 830 can include disabling communication with the original serving network of the UE and preferring the network configured to offer the emergency call service based, at least, on the modifying the configuration parameter.

In the methods 800, 810, 820 and/or 830, modifying a configuration parameter of a UE can be performed autonomously by the UE. A value of a modified configuration parameter can persist until at least one of: the UE is powered off or an expiration of a timer. In some embodiments, a value of the timer is configured in the UE. In some embodiments, a value of the timer is configured by a network of the wireless communication system and is transmitted to the UE by the network of the wireless communication system. In some embodiments, a value of the timer is greater than a time for performing callback of an emergency call.

Figure 8E:
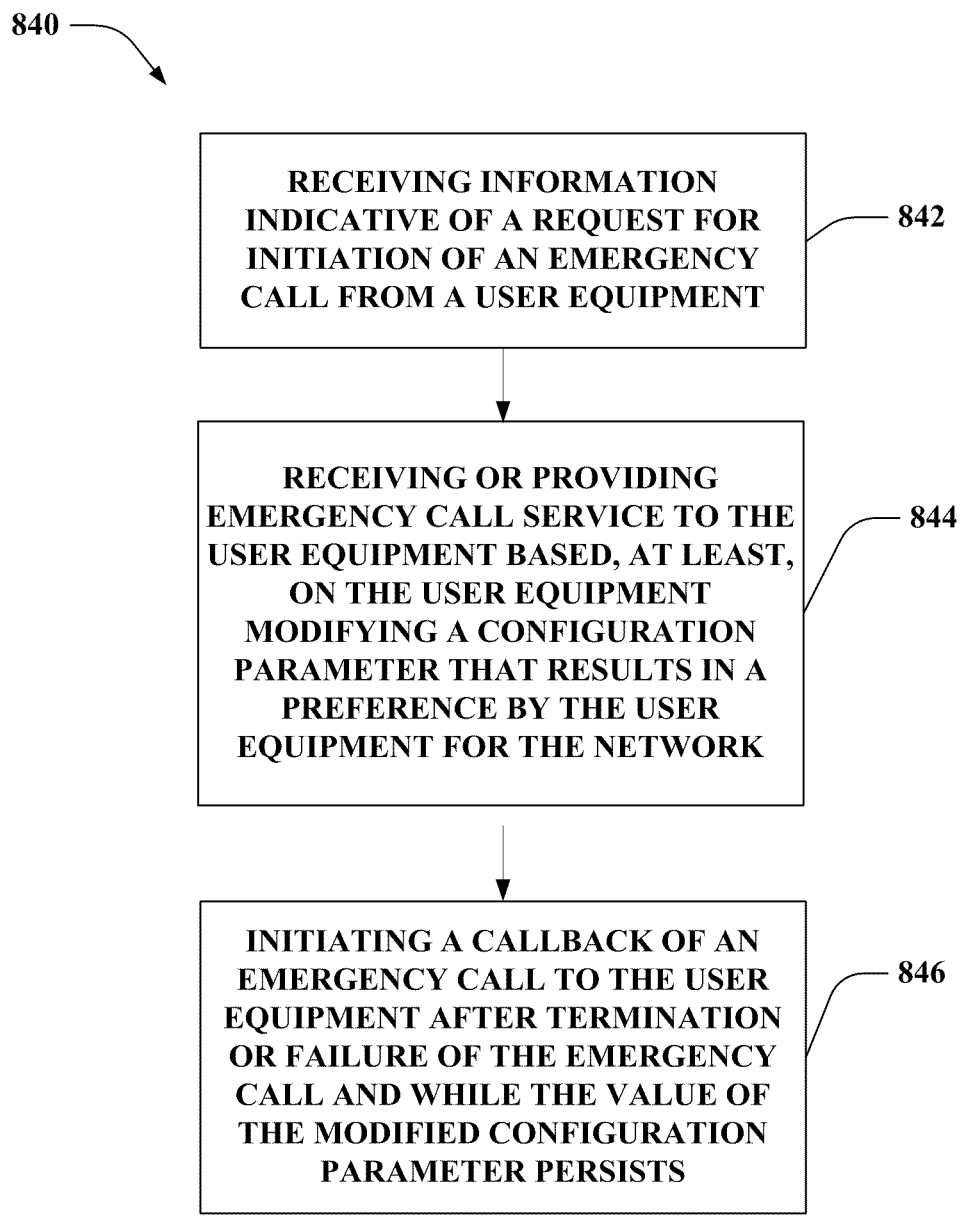

FIG. 8E is another illustration of examples of flow charts of methods for facilitating emergency call service in accordance with various aspects set forth herein. At 842, method 840 can include receiving information indicative of a request for initiation of an emergency call from a UE. At 844, method 840 can include receiving or providing emergency call service to the UE, wherein the receiving or providing is performed by a network based, at least, on the UE modifying its configuration parameter, wherein the configuration parameter is related to at least one of: network selection, cell selection or reselection or service selection within the wireless communication system, wherein a modified configuration parameter results in a preference by the UE for the network.

At 846, method 840 can include initiating a callback of an emergency call to the UE after termination or failure of the emergency call, wherein initiating a callback is performed while the value of the modified configuration parameter persists.

In various embodiments, the modified configuration parameter is indicative of at least one of: a preference for circuit-switched services over packet-switched services, a preference or an exclusive use of circuit-switched voice service or a preference for the network over an original serving network of the UE based, at least, on the modifying the configuration parameter.

In some embodiments, the configuration parameter is a parameter autonomously modified by the UE. In some embodiments, the providing emergency call service to a UE is performed while a value of a modified configuration parameter persists, wherein the value persists until at least one of: the UE is powered off or an expiration of a timer.

Figure 9:
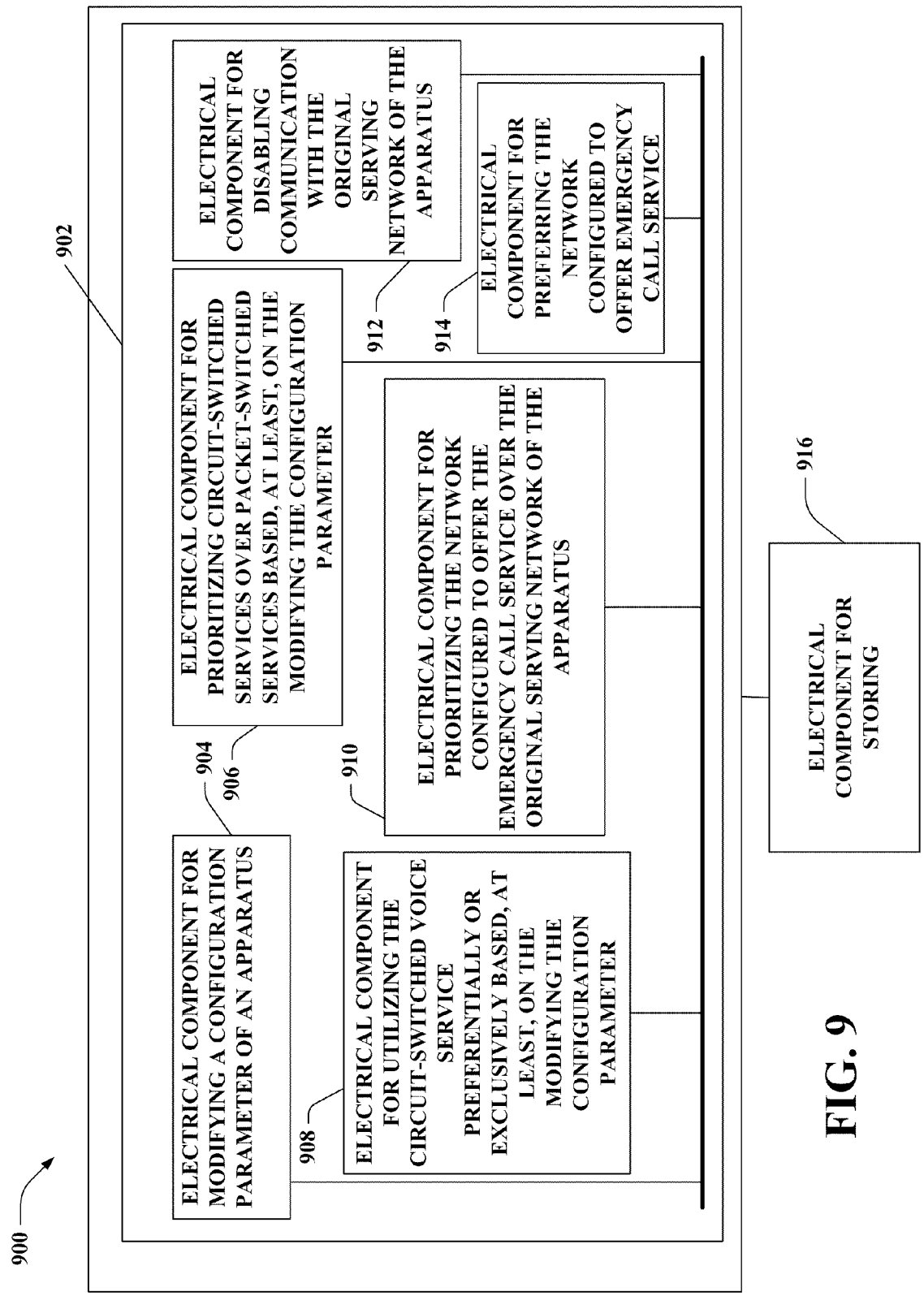
FIGS. 9 and 10 are illustrations of block diagrams of example systems for facilitating emergency call service in accordance with various aspects set forth herein.

FIG. 9 is an illustration of a block diagram of an example system facilitating emergency call service in accordance with various aspects set forth herein.

It is to be appreciated that system 900 is represented as including functional blocks, which can be functional blocks that represent functions implemented by a processor, hardware, software, firmware, or combination thereof. System 900 can include a logical or physical grouping 902 of electrical components for facilitating emergency call provisioning. The electrical components can act in conjunction. For instance, the logical or physical grouping 902 can include an electrical component 904 for modifying a configuration parameter of an apparatus, wherein the configuration parameter is related to at least one of: network selection, cell selection or reselection or service selection within a wireless communication system, and wherein a modified configuration parameter results in a preference by the apparatus for a network, cell or service configured to support emergency calls.

The logical or physical grouping 902 can also include an electrical component 906 for prioritizing circuit-switched services over packet-switched services based, at least, on the modifying the configuration parameter. The logical or physical grouping 902 can include an electrical component 908 for utilizing the circuit-switched voice service preferentially or exclusively based, at least, on the modifying the configuration parameter.

The logical or physical grouping 902 can also include an electrical component 910 for prioritizing the network configured to offer the emergency call service over the original serving network of the apparatus. In some embodiments, the prioritizing can be based, at least, on the modifying the configuration parameter. In some embodiments, the prioritizing can be based, at least, on a determination by the apparatus of whether the apparatus can obtain voice services from the original serving network.

The logical or physical grouping 902 can also include an electrical component 912 for disabling communication with the original serving network of the apparatus. The logical or physical grouping 902 can also include an electrical component 914 for preferring the network configured to offer the emergency call service based, at least, on the modifying the configuration parameter.

In some embodiments, modifying a configuration parameter of an apparatus is performed autonomously by the apparatus. In some embodiments, a value of a modified configuration parameter persists until at least one of: the apparatus is powered off or an expiration of a timer. In some embodiments, a value of the timer is configured in the apparatus. In some embodiments, a value of the timer is configured by a network of the wireless communication system and is transmitted to the apparatus by the network of the wireless communication system. In some embodiments, a value of the timer is greater than a time for performing callback of an emergency call.

The logical or physical grouping 902 can also include an electrical component 916 for storing. The electrical component 916 for storing can be configured to store configuration information, network information, cell priorities information and/or service type information.

Figure 10:
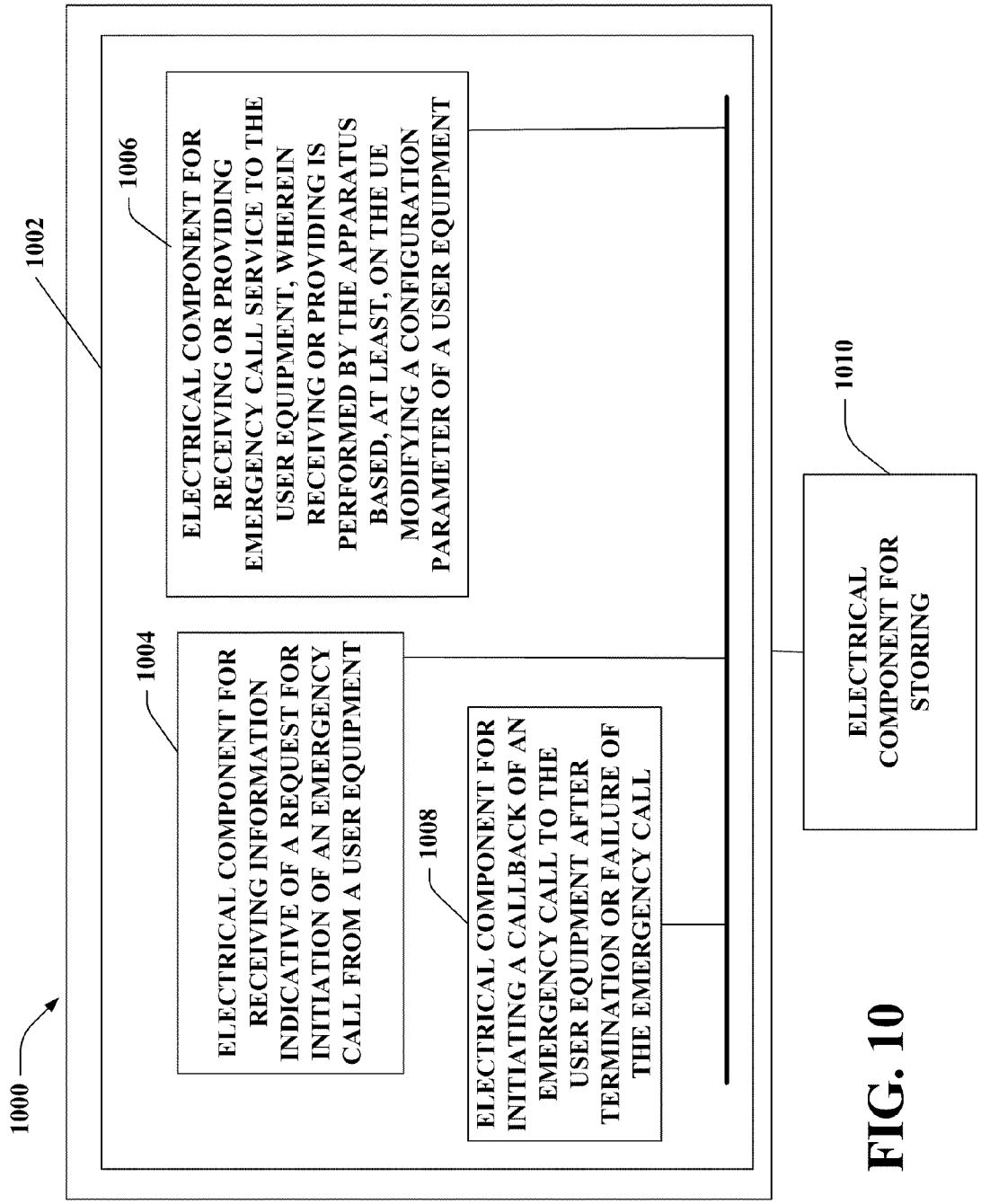

FIG. 10 is an illustration of a block diagram of an example system facilitating emergency call service in accordance with various aspects set forth herein.

It is to be appreciated that system 1000 is represented as including functional blocks, which can be functional blocks that represent functions implemented by a processor, hardware, software, firmware, or combination thereof. System 1000 can include a logical or physical grouping 1002 of electrical components for facilitating emergency call provisioning.

The logical or physical grouping 1002 can include an electrical component 1004 for receiving information indicative of a request for initiation of an emergency call from a UE. The logical or physical grouping 1002 can include an electrical component 1006 for receiving or providing emergency call service to the UE, wherein receiving or providing is performed by the apparatus based, at least, on the UE modifying a configuration parameter of a UE, wherein the configuration parameter is related to at least one of: network selection, cell selection or reselection or service selection within the wireless communication system, wherein a modified configuration parameter results in a preference by the UE for the network.

The logical or physical grouping 1002 can include an electrical component 1008 for initiating a callback of an emergency call to the UE after termination or failure of the emergency call, wherein initiating a callback is performed while the value of the modified configuration parameter persists.

In some embodiments, the modified configuration parameter is indicative of at least one of: a preference for circuit-switched services over packet-switched services, a preference or an exclusive use of circuit-switched voice service or a preference for the network over an original serving network of the UE based, at least, on the modifying the configuration parameter. In some embodiments, the configuration parameter is a parameter autonomously modified by the UE. In some embodiments, the providing emergency call service to a UE is performed while a value of a modified configuration parameter persists, wherein the value persists until at least one of: the UE is powered off or an expiration of a timer.

The logical or physical grouping 1002 can include an electrical component 1010 for storing. The electrical component 1010 for storing can be configured to store UE information, timer information for one or more UEs, configuration information, network information, cell priorities information and/or service type information.

A wireless multiple-access communication system can simultaneously support communication for multiple wireless access terminals. As mentioned above, each terminal can communicate with one or more BSs via transmissions on the forward and reverse links. The forward link (or downlink) refers to the communication link from the BSs to the terminals, and the reverse link (or uplink) refers to the communication link from the terminals to the BSs. This communication link can be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
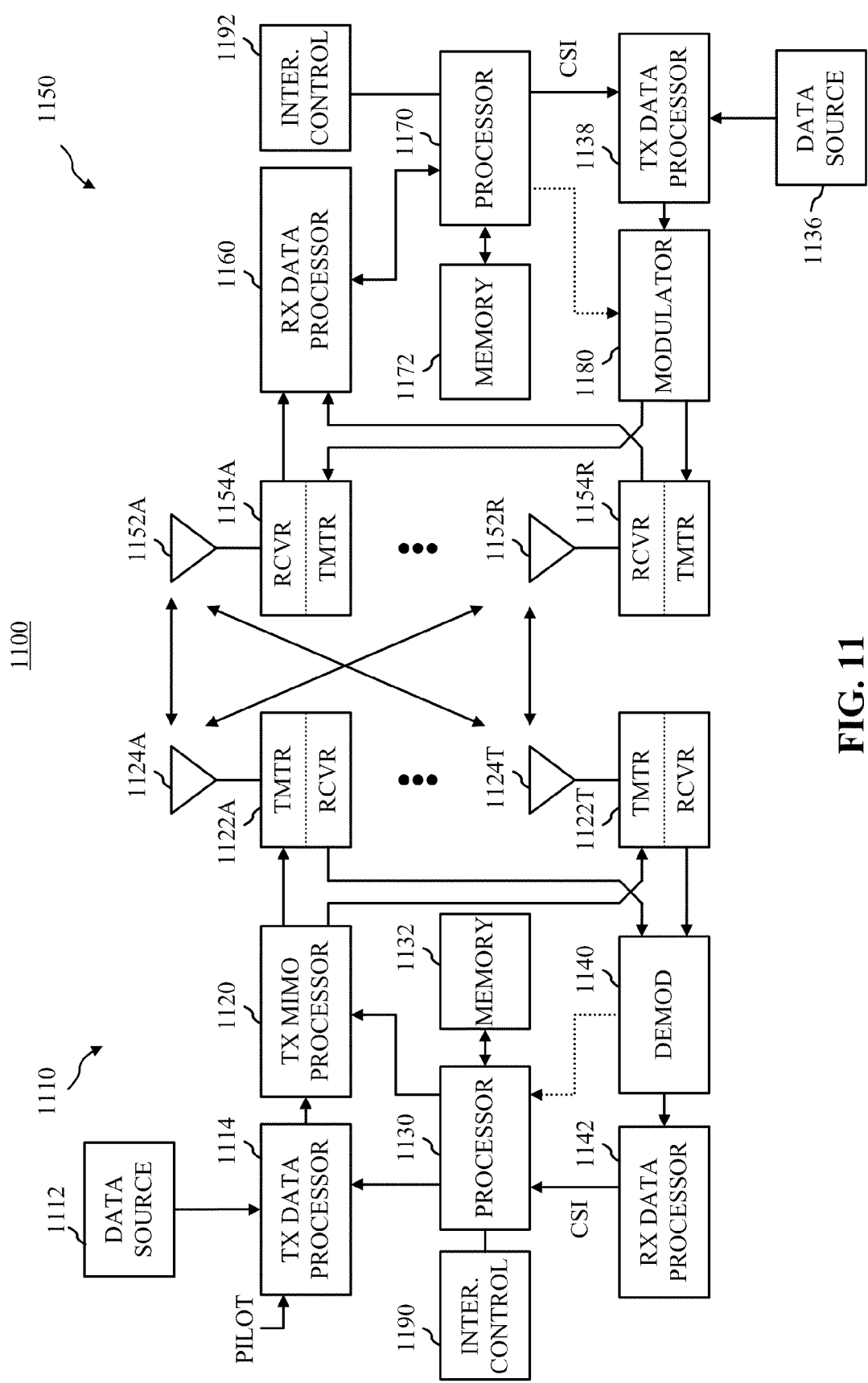
FIG. 11 shows an example wireless communication system in which the embodiments described herein can be employed in accordance with various aspects set forth herein.

FIG. 11 shows an example wireless communication system in which the embodiments described herein can be employed in accordance with various aspects set forth herein. The teachings herein may be incorporated into a node (e.g., a device) employing various components for communicating with at least one other node. FIG. 11 depicts several sample components that may be employed to facilitate communication between nodes. Specifically, FIG. 11 illustrates a wireless device 1110 (e.g., an access point) and a wireless device 1150 (e.g., an access terminal) of a wireless communication system 1100 (e.g., MIMO system). At the device 1110, traffic data for a number of data streams is provided from a data source 1112 to a transmit (TX) data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform interference control operations as taught herein. For example, an interference (INTER.) control component 1190 may cooperate with the processor 1130 and/or other components of the device 1110 to send/receive signals to/from another device (e.g., device 1150) as taught herein. Similarly, an interference control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the interference control component 1190 and the processor 1130 and a single processing component may provide the functionality of the interference control component 1192 and the processor 1170.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to enable autonomous change of User Equipment circuit-switched (CS)/packet-switched (PS) mode and access stratum reselection priorities for facilitating emergency call service in a wireless communication system, the method comprising:
  modifying a configuration parameter of a user equipment, wherein the configuration parameter is related to at least one of: network selection, cell selection or reselection or service selection within the wireless communication system, and wherein a modified configuration parameter results in a preference by the user equipment, wherein the preference by the user equipment is for a network, cell or service configured to support emergency calls by the user equipment, wherein the configuration parameter includes information indicative of a plurality of cell reselection priorities, wherein the wireless communication system includes a plurality of networks wherein at least one of the plurality of networks is an original serving network of the user equipment and at least another of the plurality of networks is a network configured to offer emergency call service to the user equipment;
  prioritizing a network domain over another based, at least, on the modification of the configuration parameter; and
  prioritizing the network configured to offer emergency call service to the user equipment over the original serving network of the user equipment based, at least, on the modifying the configuration parameter.

2. The method of claim 1, wherein the configuration parameter includes information indicative of a domain preference mode of the user equipment, and wherein the domain preference mode comprises relative priorities for operations in circuit-switched or packet-switched domains,
  the method further comprising prioritizing circuit-switched services over packet-switched services based, at least, on the modifying the configuration parameter.

3. The method of claim 1, wherein operation by the user equipment is in a packet-switched mode prior to modifying a configuration parameter, and wherein the configuration parameter includes information indicative of a network configured to offer emergency call service to the user equipment.

4. The method of claim 1, wherein a plurality of voice services, including a circuit-switched voice service, are available to the user equipment, and wherein the configuration parameter includes information indicative of a voice domain preference of the user equipment,
  the method further comprising utilizing the circuit-switched voice service preferentially or exclusively based, at least, on the modifying the configuration parameter.

5. The method of claim 1, wherein the modifying a configuration parameter of a user equipment is performed autonomously by the user equipment.

6. The method of claim 1, wherein a value of a modified configuration parameter persists until at least one of: the user equipment is powered off or an expiration of a timer.

7. The method of claim 6, wherein a value of the timer is configured in the user equipment.

8. The method of claim 6, wherein a value of the timer is configured by a network of the wireless communication system and is transmitted to the user equipment by the network of the wireless communication system.

9. The method of claim 6, wherein a value of the timer is greater than a time for performing callback of an emergency call.

10. A computer program product, comprising:
  a computer-readable non-transitory storage medium configured to enable autonomous change of User Equipment circuit-switched (CS)/packet-switched (PS) mode and access stratum reselection priorities, comprising:
    a first set of codes for causing a computer to modify a configuration parameter of the computer, wherein the configuration parameter is related to at least one of: network selection, cell selection or reselection or service selection within a wireless communication system, and wherein a modified configuration parameter results in a preference by the computer for a network, cell or service configured to support emergency calls by the user equipment, and wherein the computer is included in a user equipment, wherein the configuration parameter includes information indicative of a plurality of cell reselection priorities, wherein the wireless communication system includes a plurality of networks wherein at least one of the plurality of networks is an original serving network of the computer and at least another of the plurality of networks is a network configured to offer emergency call service to the computer;
    a second set of codes for causing the computer to prioritize a network domain over another based, at least, on the modification of the configuration parameter; and
    a third set of codes for causing the computer to prioritize the network configured to offer emergency call service to the computer over the original serving network of the computer based, at least, on the modifying the configuration parameter.

11. The computer program product of claim 10, wherein the configuration parameter includes information indicative of a domain preference mode of the computer, and wherein the domain preference mode comprises relative priorities for operations in circuit-switched or packet-switched domains,
  the computer program product further comprises a set of codes for causing the computer to prioritize circuit-switched services over packet-switched services based, at least, on the modifying the configuration parameter.

12. The computer program product of claim 10, wherein the computer is configured to operate in a packet-switched mode prior to modifying a configuration parameter, and wherein the configuration parameter includes information indicative of a network configured to offer emergency call service to the computer.

13. The computer program product of claim 10, wherein a plurality of voice services, including a circuit-switched voice service, are available to the user equipment, and wherein the configuration parameter includes information indicative of a voice domain preference of the computer, the computer program product further comprising a set of codes for causing the computer to utilize the circuit-switched voice service preferentially or exclusively based, at least, on the modifying the configuration parameter.

14. The computer program product of claim 10, wherein the modifying a configuration parameter of a computer is performed autonomously by the computer.

15. The computer program product of claim 10, wherein a value of a modified configuration parameter persists until at least one of: the computer is powered off or an expiration of a timer.

16. The computer program product of claim 15, wherein a value of the timer is configured in the computer.

17. The computer program product of claim 15, wherein a value of the timer is configured by a network of the wireless communication system and is transmitted to the computer by the network of the wireless communication system.

18. The computer program product of claim 15, wherein a value of the timer is greater than a time for performing callback of an emergency call.

19. An apparatus to enable autonomous change of User Equipment circuit-switched (CS)/packet-switched (PS) mode and access stratum reselection priorities, comprising:

means for modifying a configuration parameter of a user equipment, wherein the configuration parameter is related to at least one of: network selection, cell selection or reselection or service selection within a wireless communication system, and wherein a modified configuration parameter results in a preference by the apparatus for a network, cell or service configured to support emergency calls by the apparatus, wherein the configuration parameter includes information indicative of a plurality of cell reselection priorities, wherein the wireless communication system includes a plurality of networks wherein at least one of the plurality of networks is an original serving network of the apparatus and at least another of the plurality of networks is a network configured to offer emergency call service to the apparatus;

means for prioritizing a network domain over another based, at least, on the modification of the configuration parameter; and means for prioritizing the network configured to offer emergency call service to the apparatus over the original serving network of the apparatus based, at least, on the modifying the configuration parameter.

20. The apparatus of claim 19, wherein the configuration parameter includes information indicative of a domain preference mode of the apparatus, and wherein the domain preference mode comprises relative priorities for operations in circuit-switched or packet-switched domains, the apparatus further comprising means for prioritizing circuit-switched services over packet-switched services based, at least, on the modifying the configuration parameter.

21. The apparatus of claim 19, wherein the apparatus is configured to operate in a packet-switched mode prior to modifying a configuration parameter, and wherein the configuration parameter includes information indicative of a network configured to offer emergency call service to the apparatus.

22. The apparatus of claim 19, wherein a plurality of voice services, including a circuit-switched voice service, are available to the apparatus, and wherein the configuration parameter includes information indicative of a voice domain preference of the apparatus, the apparatus further comprising means for utilizing the circuit-switched voice service preferentially or exclusively based, at least, on the modifying the configuration parameter.

23. The apparatus of claim 19, wherein the modifying a configuration parameter of a apparatus is performed autonomously by the user equipment.

24. The apparatus of claim 19, wherein a value of a modified configuration parameter persists until at least one of: the apparatus is powered off or an expiration of a timer.

25. The apparatus of claim 24, wherein a value of the timer is configured in the apparatus.

26. The apparatus of claim 24, wherein a value of the timer is configured by a network of the wireless communication system and is transmitted to the apparatus by the network of the wireless communication system.

27. The apparatus of claim 24, wherein a value of the timer is greater than a time for performing callback of an emergency call.

28. An apparatus to enable autonomous change of User Equipment circuit-switched (CS)/packet-switched (PS) mode and access stratum reselection priorities, comprising:

a configuration module configured to:

modify a configuration parameter of a user equipment, wherein the configuration parameter is related to at least one of: network selection, cell selection or reselection or service selection within a wireless communication system, and wherein a modified configuration parameter results in a preference by the apparatus for a network, cell or service configured to support emergency calls by the apparatus, wherein the apparatus is a user equipment, wherein the configuration parameter includes information indicative of a plurality of cell reselection priorities, wherein the wireless communication system includes a plurality of networks wherein at least one of the plurality of networks is an original serving network of the apparatus and at least another of the plurality of networks is a network configured to offer emergency call service to the apparatus;

prioritize a network domain over another based, at least, on the modification of the configuration parameter; and prioritize the network configured to offer emergency call service to the apparatus over the original serving network of the apparatus based, at least, on the modifying the configuration parameter.

29. The apparatus of claim 28, wherein the configuration parameter includes information indicative of a domain preference mode of the apparatus, and wherein the domain preference mode comprises relative priorities for operations in circuit-switched or packet-switched domains, wherein the configuration module is further configured to prioritize circuit-switched services over packet-switched services based, at least, on the modifying the configuration parameter.

30. The apparatus of claim 28, wherein the apparatus is configured to operate in a packet-switched mode prior to modifying a configuration parameter, and wherein the configuration parameter includes information indicative of a network configured to offer emergency call service to the apparatus.

31. The apparatus of claim 28, wherein a plurality of voice services, including a circuit-switched voice service, are available to the apparatus, and wherein the configuration parameter includes information indicative of a voice domain preference of the apparatus,
  wherein the configuration module is further configured to utilize the circuit-switched voice service preferentially or exclusively based, at least, on the modifying the configuration parameter.

32. The apparatus of claim 28, wherein the modifying a configuration parameter of a apparatus is performed autonomously by the user equipment.

33. The apparatus of claim 28, wherein a value of a modified configuration parameter persists until at least one of: the apparatus is powered off or an expiration of a timer.

34. The apparatus of claim 33, wherein a value of the timer is configured in the apparatus.

35. The apparatus of claim 33, wherein a value of the timer is configured by a network of the wireless communication system and is transmitted to the apparatus by the network of the wireless communication system.

36. The apparatus of claim 33, wherein a value of the timer is greater than a time for performing callback of an emergency call.

37. A method to enable autonomous change of User Equipment circuit-switched (CS)/packet-switched (PS) mode and access stratum reselection priorities for facilitating emergency call service in a wireless communication system, the method comprising:
  receiving information indicative of a request for initiation of an emergency call from a user equipment; and
  receiving or providing emergency call service to the user equipment, wherein receiving or providing is performed by a network based, at least, on the user equipment modifying a configuration parameter of a user equipment, wherein the configuration parameter is related to at least one of: network selection, cell selection or reselection or service selection within the wireless communication system, wherein a modified configuration parameter results in a preference by the user equipment for the network, wherein the configuration parameter includes information indicative of a plurality of cell reselection priorities, wherein the user equipment includes a plurality of networks wherein at least one of the plurality of networks is an original serving network of the user equipment and at least another of the plurality of networks is a network configured to offer emergency call service to the user equipment, wherein a network domain is prioritized over another based, at least, on the modification of the configuration parameter, and wherein the network domain is prioritized to offer emergency call service to the user equipment over the original serving network of the user equipment based, at least, on the modified the configuration parameter.

38. The method of claim 37, wherein the providing emergency call service to a user equipment is performed while a value of a modified configuration parameter persists, wherein the value of a modified configuration parameter persists until at least one of: the user equipment is powered off or an expiration of a timer.

39. The method of claim 38, further comprising initiating a callback of an emergency call to the user equipment after termination or failure of the emergency call, wherein initiating a callback is performed while the value of the modified configuration parameter persists.

40. A computer program product, comprising:
  a computer-readable non-transitory storage medium configured to enable autonomous change of User Equipment circuit-switched (CS)/packet-switched (PS) mode and access stratum reselection priorities, comprising:
    a first set of codes for causing a computer to receive information indicative of a request for initiation of an emergency call from a user equipment; and
    a second set of codes for causing the computer to receive or provide emergency call service to the user equipment, wherein receiving or providing is performed by the computer based, at least, on the user equipment modifying a configuration parameter of a user equipment, wherein the configuration parameter is related to at least one of: network selection, cell selection or reselection or service selection within a wireless communication system, wherein a modified configuration parameter results in a preference by the user equipment for a network configured to offer emergency call service to the user equipment, wherein the configuration parameter includes information indicative of a plurality of cell reselection priorities, wherein the user equipment includes a plurality of networks wherein at least one of the plurality of networks is an original serving network of the user equipment and at least another of the plurality of networks is a network configured to offer emergency call service to the user equipment, wherein a network domain is prioritized over another based, at least, on the modification of the configuration parameter, and wherein the network domain is prioritized to offer emergency call service to the user equipment over the original serving network of the user equipment based, at least, on the modified the configuration parameter.

41. The computer program product of claim 40, wherein receiving or providing emergency call service to a user equipment is performed while a value of a modified configuration parameter persists, wherein the value of a modified configuration parameter persists until at least one of: the user equipment is powered off or an expiration of a timer.

42. The computer program product of claim 41, further comprising a third set of codes for causing the computer to initiate a callback of an emergency call to the user equipment after termination or failure of the emergency call, wherein initiating a callback is performed while the value of a modified configuration parameter persists.

43. An apparatus to enable autonomous change of User Equipment circuit-switched (CS)/packet-switched (PS) mode and access stratum reselection priorities, comprising:
  means for receiving information indicative of a request for initiation of an emergency call from a user equipment; and
  means for receiving or providing emergency call service to the user equipment, wherein receiving or providing is performed by the apparatus based, at least, on the user equipment modifying a configuration parameter of a user equipment, wherein the configuration parameter is related to at least one of: network selection, cell selection or reselection or service selection within a wireless communication system, wherein a modified configuration parameter results in a preference by the user equipment for a network configured to offer emergency call service to the user equipment, wherein the configuration parameter includes information indicative of a plurality of cell reselection priorities, wherein the user equipment includes a plurality of networks wherein at least one of the plurality of networks is an original serving network of the user equipment and at least another of the plurality of networks is a network configured to offer emergency call service to the user equipment, wherein a network domain is prioritized over another based, at least, on the modification of the configuration parameter, and wherein the network domain is prioritized to offer emergency call service to the user equipment over the original serving network of the user equipment based, at least, on the modified the configuration parameter.

44. The apparatus of claim 43, wherein receiving or providing emergency call service to a user equipment is performed while a value of a modified configuration parameter persists, wherein the value of a modified configuration parameter persists until at least one of: the user equipment is powered off or an expiration of a timer.

45. The apparatus of claim 44, further comprising means for initiating a callback of an emergency call to the user equipment after termination or failure of the emergency call, wherein initiating a callback is performed while the value of a modified configuration parameter persists.

46. An apparatus to enable autonomous change of User Equipment circuit-switched (CS)/packet-switched (PS) mode and access stratum reselection priorities, comprising:
a configuration module configured to:
receive information indicative of a request for initiation of an emergency call from a user equipment; and
receive or provide emergency call service to the user equipment, wherein receiving or providing is performed by the apparatus based, at least, on the user equipment modifying a configuration parameter of a user equipment, wherein the configuration parameter is related to at least one of: network selection, cell selection or reselection or service selection within a wireless communication system, wherein a modified configuration parameter results in a preference by the user equipment for a network configured to offer emergency call service to the user equipment, wherein the configuration parameter includes information indicative of a plurality of cell reselection priorities, wherein the user equipment includes a plurality of networks wherein at least one of the plurality of networks is an original serving network of the user equipment and at least another of the plurality of networks is a network configured to offer emergency call service to the user equipment, wherein a network domain is prioritized over another based, at least, on the modification of the configuration parameter, and wherein the network domain is prioritized to offer emergency call service to the user equipment over the original serving network of the user equipment based, at least, on the modified the configuration parameter.

47. The apparatus of claim 46, wherein the providing emergency call service to a user equipment is performed while a value of a modified configuration parameter persists, wherein the value of a modified configuration parameter persists until at least one of: the user equipment is powered off or an expiration of a timer.

48. The apparatus of claim 47, wherein the configuration module is further configured to initiate a callback of an emergency call to the user equipment after termination or failure of the emergency call, wherein initiating a callback is performed while the value of a modified configuration parameter persists.

* * * * *